US012619423B1

(12) United States Patent
Statham et al.

(10) Patent No.: US 12,619,423 B1
(45) Date of Patent: May 5, 2026

(54) PRIVACY PRESERVING CONTINUOUS INTEGRATION / CONTINUOUS DEPLOYMENT (CI/CD) VIA REMOTELY DEPLOYED AGENTS

(71) Applicant: SAS Institute Inc., Cary, NC (US)

(72) Inventors: Craig Geoffrey Statham, Apex, NC (US); Adam Robertson Noll, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 19/296,591

(22) Filed: Aug. 11, 2025

Related U.S. Application Data

(60) Provisional application No. 63/775,120, filed on Mar. 20, 2025.

(51) Int. Cl.
*G06F 8/65* (2018.01)
*H04L 9/40* (2022.01)

(52) U.S. Cl.
CPC ............... *G06F 8/65* (2013.01); *H04L 63/10* (2013.01)

(58) Field of Classification Search
CPC .................................. G06F 8/65; H04L 63/10
See application file for complete search history.

(56) References Cited

U.S. PATENT DOCUMENTS

| | | | | |
|---|---|---|---|---|
| 12,399,706 | B2 * | 8/2025 | Kirmse | G06F 9/5072 |
| 2017/0257432 | A1 | 9/2017 | Fu et al. | |
| 2019/0377838 | A1 * | 12/2019 | Wang | G06F 9/5066 |

| | | | | |
|---|---|---|---|---|
| 2021/0336936 | A1 | 10/2021 | Feng et al. | |
| 2025/0110720 | A1 * | 4/2025 | Byard | G06F 8/65 |
| 2025/0291572 | A1 * | 9/2025 | Di Stefano | G06F 8/77 |

FOREIGN PATENT DOCUMENTS

| | | | | |
|---|---|---|---|---|
| FR | 3017725 | A1 * | 8/2015 | G06F 8/61 |

OTHER PUBLICATIONS

Lingfeng Wang et al.; Component-Based Performance-Sensitive Real-Time Embedded Software; IEEE; 10 pages; retrieved on Jan. 28, 2026 (Year: 2005).*
Wei Wang et al; An Ensemble Machine Learning Framework for Automated Sensitive Information Leakage Detection in Code Repositories; EIT; pp. 552-556; retrieved on Jan. 28, 2026 (Year: 2025).*

* cited by examiner

*Primary Examiner* — S. Sough
*Assistant Examiner* — Cuong V Luu
(74) *Attorney, Agent, or Firm* — Dority & Manning, P.A.

(57) ABSTRACT

An agent deployment request is received for an external computing environment. An agentic module is configured for deployment to the external computing environment based on characteristics of the external computing environment, wherein the agentic module comprises a computational agent operable to process information stored within the external computing environment and a corresponding agentic controller. Responsive to the agent deployment request, a first unit of software instructions is generated that, when executed, instantiates an agentic module instance within the external computing environment. The first unit of software instructions is transmitted to the external computing environment. A performance metric related to processing of the information stored within the external computing environment by a computational agent instance of the agentic module instance is received from an agentic controller instance of the agentic module instance.

30 Claims, 18 Drawing Sheets

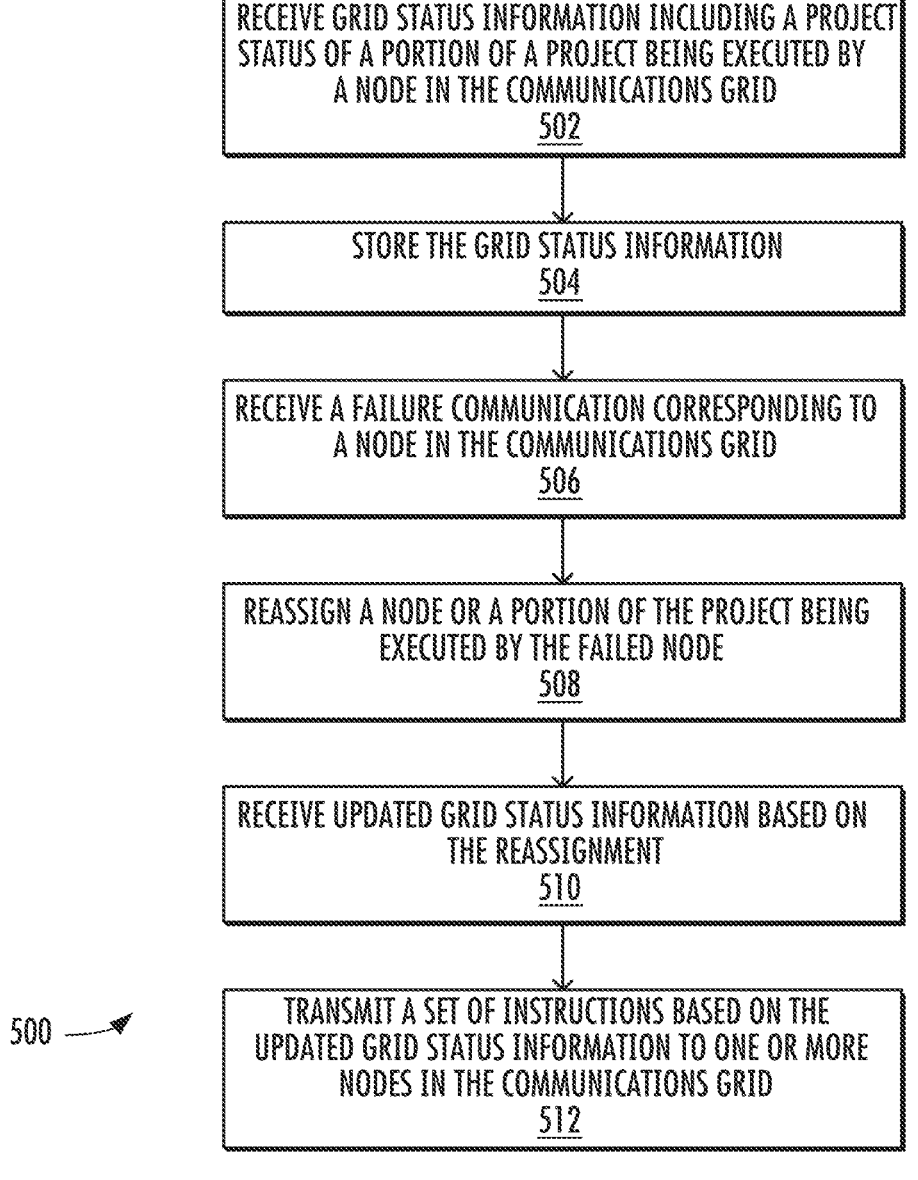

RECEIVE GRID STATUS INFORMATION INCLUDING A PROJECT STATUS OF A PORTION OF A PROJECT BEING EXECUTED BY A NODE IN THE COMMUNICATIONS GRID
502

STORE THE GRID STATUS INFORMATION
504

RECEIVE A FAILURE COMMUNICATION CORRESPONDING TO A NODE IN THE COMMUNICATIONS GRID
506

REASSIGN A NODE OR A PORTION OF THE PROJECT BEING EXECUTED BY THE FAILED NODE
508

RECEIVE UPDATED GRID STATUS INFORMATION BASED ON THE REASSIGNMENT
510

500

TRANSMIT A SET OF INSTRUCTIONS BASED ON THE UPDATED GRID STATUS INFORMATION TO ONE OR MORE NODES IN THE COMMUNICATIONS GRID
512

FIG. 5

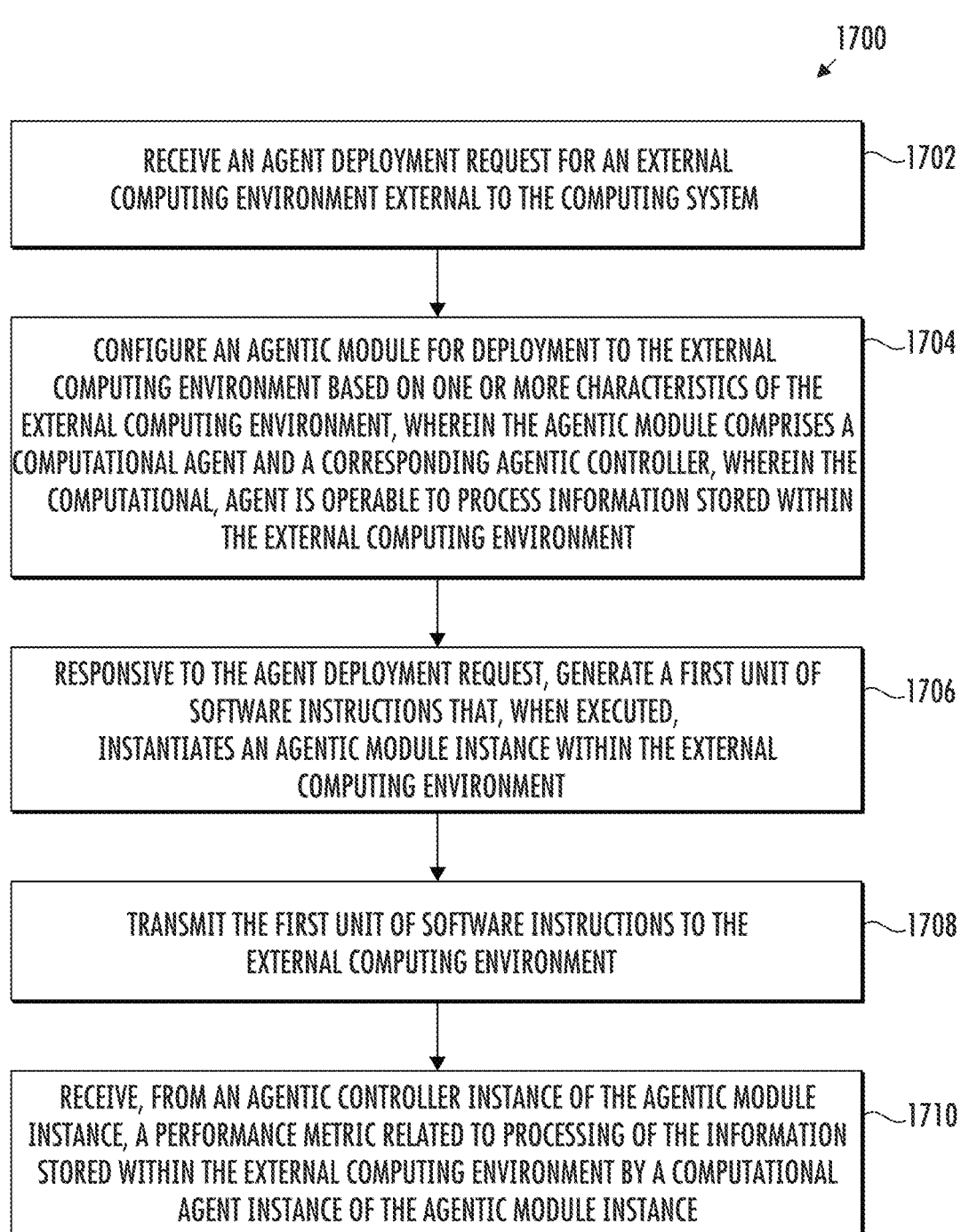

1700

RECEIVE AN AGENT DEPLOYMENT REQUEST FOR AN EXTERNAL
COMPUTING ENVIRONMENT EXTERNAL TO THE COMPUTING SYSTEM ~1702

CONFIGURE AN AGENTIC MODULE FOR DEPLOYMENT TO THE EXTERNAL
COMPUTING ENVIRONMENT BASED ON ONE OR MORE CHARACTERISTICS OF THE
EXTERNAL COMPUTING ENVIRONMENT, WHEREIN THE AGENTIC MODULE COMPRISES A
COMPUTATIONAL AGENT AND A CORRESPONDING AGENTIC CONTROLLER, WHEREIN THE
COMPUTATIONAL, AGENT IS OPERABLE TO PROCESS INFORMATION STORED WITHIN
THE EXTERNAL COMPUTING ENVIRONMENT ~1704

RESPONSIVE TO THE AGENT DEPLOYMENT REQUEST, GENERATE A FIRST UNIT OF
SOFTWARE INSTRUCTIONS THAT, WHEN EXECUTED,
INSTANTIATES AN AGENTIC MODULE INSTANCE WITHIN THE EXTERNAL
COMPUTING ENVIRONMENT ~1706

TRANSMIT THE FIRST UNIT OF SOFTWARE INSTRUCTIONS TO THE
EXTERNAL COMPUTING ENVIRONMENT ~1708

RECEIVE, FROM AN AGENTIC CONTROLLER INSTANCE OF THE AGENTIC MODULE
INSTANCE, A PERFORMANCE METRIC RELATED TO PROCESSING OF THE INFORMATION
STORED WITHIN THE EXTERNAL COMPUTING ENVIRONMENT BY A COMPUTATIONAL
AGENT INSTANCE OF THE AGENTIC MODULE INSTANCE ~1710

FIG. 17

PRIVACY PRESERVING CONTINUOUS INTEGRATION / CONTINUOUS DEPLOYMENT (CI/CD) VIA REMOTELY DEPLOYED AGENTS

PRIORITY CLAIM

This application claims the benefit of, and priority based on, 35 U.S.C. § 119 to U.S. Provisional Application No. 63/775,120, filed Mar. 20, 2025, the disclosure of which is incorporated herein by reference in its entirety.

BACKGROUND

Continuous Integration and Continuous Deployment (CI/CD) refers to a set of software development practices and associated tooling that automate the process of integrating code changes into a shared repository and deploying software updates to production or other environments. In a typical CI/CD pipeline, source code changes are automatically built, tested, and packaged upon submission to a version control system. The resulting build artifacts are then staged for deployment through defined workflows that may include additional testing, configuration, and release steps. CI/CD systems may be implemented using orchestration platforms that manage the execution of various pipeline stages and facilitate coordination between development, testing, and deployment environments.

SUMMARY

This summary is not intended to identify only key or essential features of the described subject matter, nor is it intended to be used in isolation to determine the scope of the described subject matter. The subject matter should be understood by reference to appropriate portions of the entire specification of this patent application, any or all drawings, and each claim.

In one implementation, a computer-program product tangibly embodied in a non-transitory machine-readable storage medium is provided. The computer-program product includes instructions operable to cause a processor device of a computing system to receive an agent deployment request for an external computing environment external to the computing system. The processor device is further to configure an agentic module for deployment to the external computing environment based on one or more characteristics of the external computing environment, wherein the agentic module comprises a computational agent and a corresponding agentic controller, wherein the computational agent is operable to process information stored within the external computing environment. The processor device is further to responsive to the agent deployment request, generate a first unit of software instructions that, when executed, instantiates an agentic module instance within the external computing environment. The processor device is further to transmit the first unit of software instructions to the external computing environment. The processor device is further to receive, from an agentic controller instance of the agentic module instance, a performance metric related to processing of the information stored within the external computing environment by a computational agent instance of the agentic module instance.

In another implementation, a computing system is provided. The computing device includes a processor device, and a non-transitory computer-readable storage medium containing instructions which, when executed on the processor device, causes the processor device to receive, from a CI/CD system, a first unit of software instructions that, when executed, instantiates an agentic module comprising a computational agent and a corresponding agentic controller, wherein the computational agent is operable to process information accessible to the computing system. The processor device is further to execute the first unit of software instructions to instantiate an agentic module instance, the agentic module instance comprising a computational agent instance and an agentic controller instance. The processor device is further to perform, with the computational agent instance, one or more computational operations on the information accessible to the computing system to obtain an output. The processor device is further to evaluate the output to determine a performance metric for the computational agent. The processor device is further to, based on the performance metric, receive a second unit of software instructions that, when executed, instantiates an updated agentic module comprising at least one of an updated agentic controller or an updated computational agent. The processor device is further to execute the second unit of software instructions to instantiate an updated agentic module instance.

In another implementation, a method is provided. The method includes receiving, by a computing system comprising one or more processor devices, an agent deployment request for an external computing environment external to the computing system. The method further includes configuring, by the computing system, an agentic module for deployment to the external computing environment based on one or more characteristics of the external computing environment, wherein the agentic module comprises a computational agent and a corresponding agentic controller, wherein the computational agent is operable to process information stored within the external computing environment. The method further includes responsive to the agent deployment request, generating, by the computing system, a first unit of software instructions that, when executed, instantiates an agentic module instance within the external computing environment. The method further includes transmitting, by the computing system, the first unit of software instructions to the external computing environment. The method further includes receiving, by the computing system and from an agentic controller instance of the agentic module instance, a performance metric related to processing of the information stored within the external computing environment by a computational agent instance of the agentic module instance.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 5 illustrates a flow chart showing an example process for adjusting a communications grid or a work project in a communications grid after a failure of a node, according to some embodiments of the present technology.

FIG. 17 depicts a flow chart diagram of an example method for deployment of a remote agentic module to implement CI/CD processes according to some implementations of the present disclosure.

DETAILED DESCRIPTION

Figure 1:
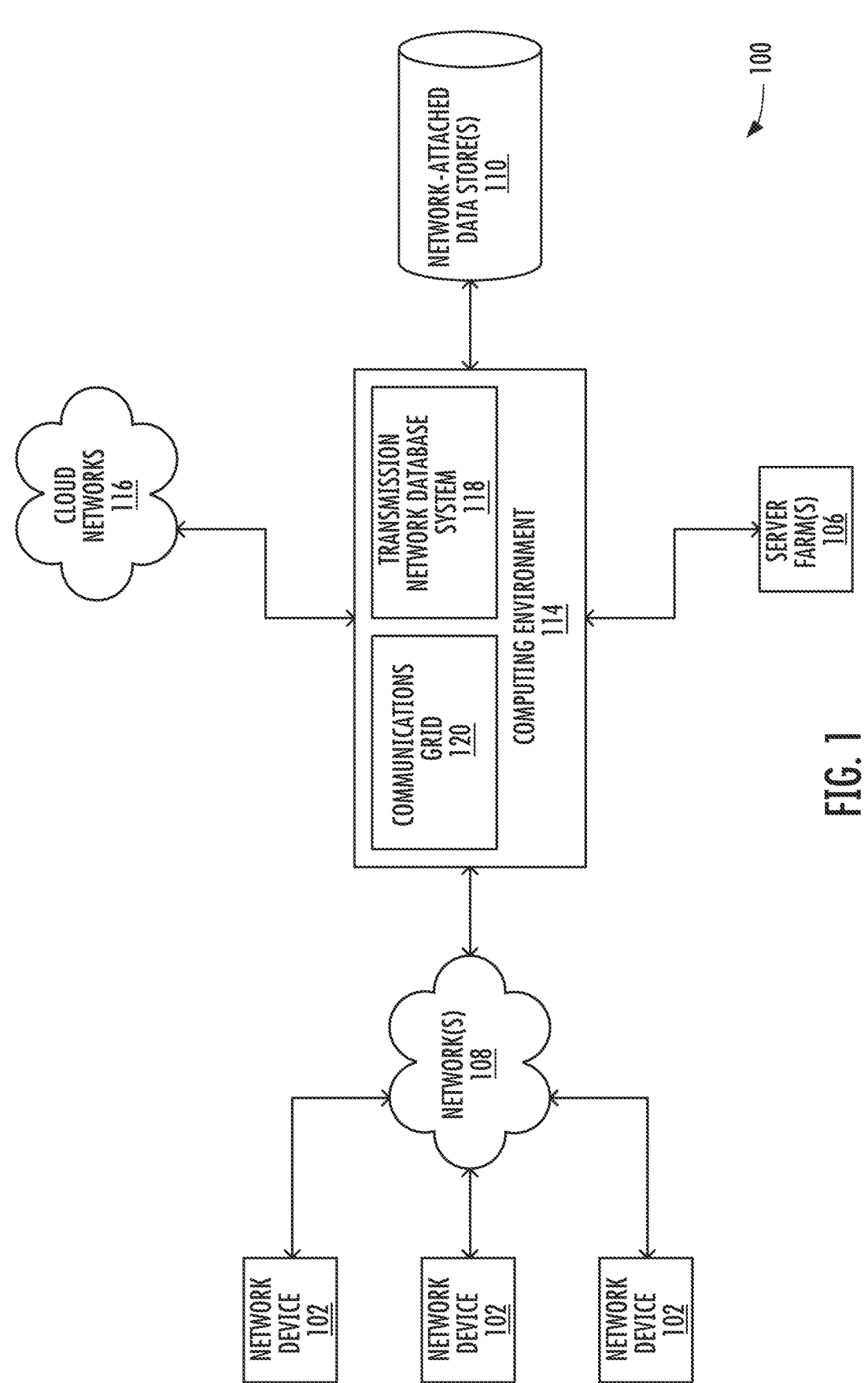
FIG. 1 illustrates a block diagram that provides an illustration of the hardware components of a computing system, according to some embodiments of the present technology.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples and claims are not limited to any particular sequence or order of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Continuous Integration and Continuous Deployment/Delivery (CI/CD) refers to a set of software development practices and associated tooling that automate the process of integrating code changes into a shared repository and deploying software updates to production or other environments. In a typical CI/CD pipeline, source code changes are automatically built, tested, and packaged upon submission to a version control system. CI/CD is often implemented both internally (e.g., for developing internal tools) and externally (e.g., for subscribers, customers, third parties, etc.). Implementing CI/CD development processes for internal projects is generally considered to be straightforward, as developers can ensure that CI/CD is implemented properly with regularly scheduled updates, secure data handling, application update compliance, etc.

Conversely, a variety of problems are frequently experienced when implementing CI/CD processes externally (i.e., for applications or software services offered to third parties). CI/CD processes lead to frequent updates to software packages deployed to client environments (e.g., multiple updates per day, etc.). However, it is generally more difficult for clients (i.e., third parties) to regularly apply scheduled CI/CD updates due to various incompatibilities or inefficiencies between the CI/CD processes and the client's environment.

For example, an internal CI/CD process may update multiple times per day without issue due to the internal development environment being properly configured for CI/CD processes, while applying the same updates to a CI/CD application deployed to client environment may cause substantial disruptions if the client environment is not properly configured or managed. As such, clients are often non-compliant with such regular update schedules, with many clients applying updates sporadically (if at all). In turn, this can lead to degraded application performance, substantial security vulnerabilities, errors, glitches, etc.

One approach that mitigates these deficiencies is to implement client-facing applications internally. Rather than deploying an application to a client environment, developers may instead deploy the application internally and enable clients to access the application via an Application Programming Interface (API) or the like. Although this approach partially mitigates problems with update non-compliance, internal hosting creates new problems as well. For example, to use the application, clients must send data to the developer system for processing, which can expose client data to a variety of security vulnerabilities. In some instances, when client data is sensitive and cannot be transmitted to external systems, clients are forced to use a different provider or abandon CI/CD processes entirely. Furthermore, implementing applications locally severely restricts application customization available to the client. In other words, applications are much less customizable by the client when the application is deployed to the developers own internal systems rather than the client system. In turn, this lack of customization can reduce performance and degrade the client experience.

Accordingly, implementations described herein propose privacy preserving ci/cd via remotely deployed agents. More specifically, the present disclosure enables the deployment of agents to manage implementation of CI/CD processes in external computing environments while preserving client data privacy. For example, a computing system (e.g., a system associated with a developer of software using CI/CD processes) can receive an agent deployment request for an external computing environment external to the computing system (e.g., a computing environment associated with a client that wishes to use the software). The computing system can configure an agentic module for deployment to the external computing environment.

Generally, an "agentic module" refers to a "self-managing," deployable unit of software instructions (e.g., a packaged application, a process, a function, a machine-learned model, a container, etc.) that can perform computational tasks remotely while deployed to a client environment. For example, an agentic module may be capable of receiving an update and applying the update to itself. For another example, an agentic module may be capable of receiving client data, determining which computational operations to perform, and then processing the client data using those computational operations. For another example, an agentic module may be capable of interacting with a client (e.g., via a chat interface, etc.) to explain various features or capabilities of the agentic module.

In some implementations, the agentic module may include or may otherwise be a machine-learned model. For example, the agentic module may include a machine-learned model capable of interacting with users within the client environment, etc. In some implementations, the agentic module may include a model with reasoning capabilities that can perform various computational operations.

The agentic module can include a computational agent and a corresponding agentic controller. For example, the agentic module may be a unit of software instructions that, when executed, deploys the computational agent and the agentic controller within the external computing environment. The computational agent can refer to a deployable unit of software instructions (e.g., a process, a function, a program, an application, a machine-learned model, etc.) that performs computational tasks with client-specific information stored to the external (i.e., client) computing environment. For example, the computational agent may perform a statistical analysis of a dataset stored to the external computing environment.

The computational agent can be managed by the agentic controller within the external computing environment. The agentic controller can refer to a deployable unit of software instructions that is configured to manage the agentic controller within the external computing environment. For example, the agentic controller can receive and provide inputs to the computational agent (e.g., specific portions of client data), route outputs from the computational agent to requestors, etc. In particular, the agentic controller can implement CI/CD processes within the external computing environment by regularly checking for CI/CD artifact availability from the developer of the agentic module. For example, the agentic controller can receive a CI/CD artifact (i.e., update, modification, etc.) for the computational agent by pinging an API of a code versioning system for the agentic module (e.g., managed by the developers of the module). The agentic controller can then directly apply the CI/CD artifact to the computational agent without needing explicit permission from the external computing environment.

It should be noted that actions attributed herein to the agentic controller and/or the computational agent can also be attributed more generally to the agentic module. In some implementations, the agentic module may be a discrete unit of software instructions that fulfills the roles of both the computational agent and the agentic controller.

In response to the agentic deployment request, the computing system can configure the agentic module based on one or more characteristics of the external computing environment. For example, the computing system may configure the agentic module differently based on the specific cloud hosting entity used to implement the external computing environment. For another example, the computing system may configure the agentic module differently based on the processor architecture of the external computing environment. For yet another example, the computing system may configure the agentic module differently based on the quantity and/or type of computing resources available within the external computing environment.

Once configured, the computing system can generate a first unit of software instructions that, when executed, instantiates an instance of the configured agentic module within the external computing environment. The computing system can then transmit the first unit of software instructions to the external computing environment. Developers (or automated systems) within the external computing environment can then execute the first unit of software instructions to instantiate an instance of the configured agentic module. The configured agentic module instance can include a computational agent instance and an agentic controller instance. For example, the first unit of software instructions may be a container image that includes the agentic module and all dependencies necessary to run the agentic module. The container image can then be mounted within the external computing environment to instantiate the agentic module instance.

The agentic module instance can operate autonomously within the computing environment to process information stored within the external computing environment (e.g., performing machine learning inference, statistical analysis, modeling, generative tasks, etc.). The computing system can then receive a performance metric from the agentic controller instance of the agentic module instance. The performance metric can be related to processing of the information stored within the external computing environment by the computational agent instance. For example, the performance metric may be descriptive of feedback provided by the client in response to an output provided by the computational agent. For another example, the performance metric may be indicative of a "self-identified" error found in an output of the computational agent by the agentic controller. In such fashion, implementations described herein enable proper application of CI/CD processes for software deployed to external environments while ensuring that the privacy of sensitive client information is preserved.

It should be noted that the performance metric received from the agentic controller instance is configured such that the client information associated with the performance metric cannot be "recovered," "reverse engineered," or otherwise determined from the performance metric. For example, if client information is processed by the computational agent to generate an output, and the performance metric is a measure of performance for the output, the client information processed to generate the output, and/or the output itself, cannot be derived from the performance metric.

Aspects of the present disclosure provide a number of technical effects and benefits. As one example technical effect and benefit, by enabling the application of CI/CD processes within external computing environments, implementations described herein provide for substantially faster release cycles for software deployed to external computing environments. In practice, many CI/CD artifacts are released to mitigate security vulnerabilities. As such, implementations described herein substantially reduce the amount of time between the release of a security vulnerability mitigation and the application of the mitigation locally, thereby improving security in external computing environments. As another example technical effect and benefit, implementations described herein inherently reduces the risk of exposing sensitive client information. More specifically, by deploying an agentic module that can enable CI/CD processes remotely, implementations described herein obviate the need for clients to transmit sensitive data to internally hosted applications.

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Example Systems

Systems depicted in some of the figures may be provided in various configurations. In some embodiments, the systems may be configured as a distributed system where one or more components of the system are distributed across one or more networks in a cloud computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
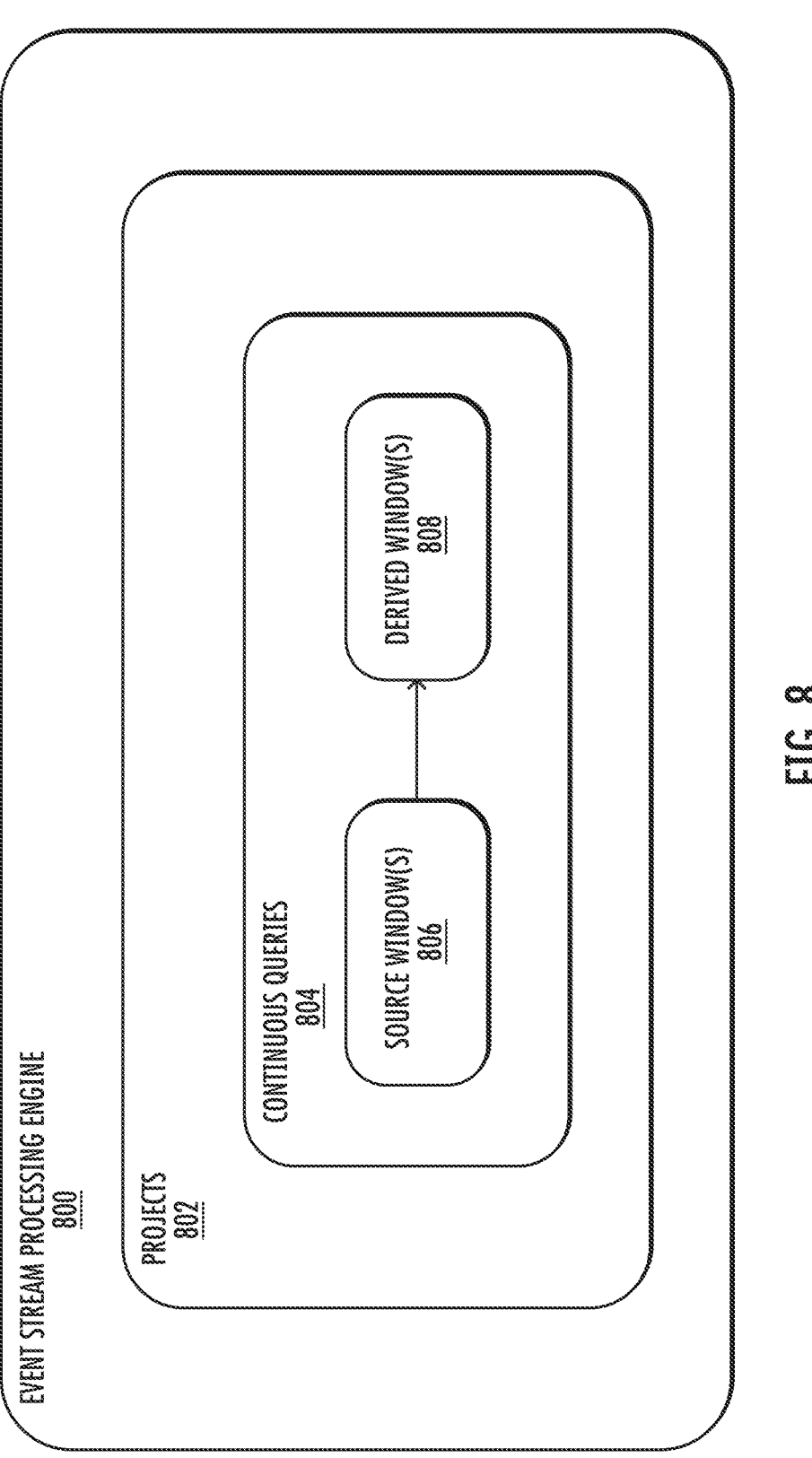
FIG. 8 illustrates a block diagram including components of an Event Stream Processing Engine (ESPE), according to embodiments of the present technology.
Figure 9:
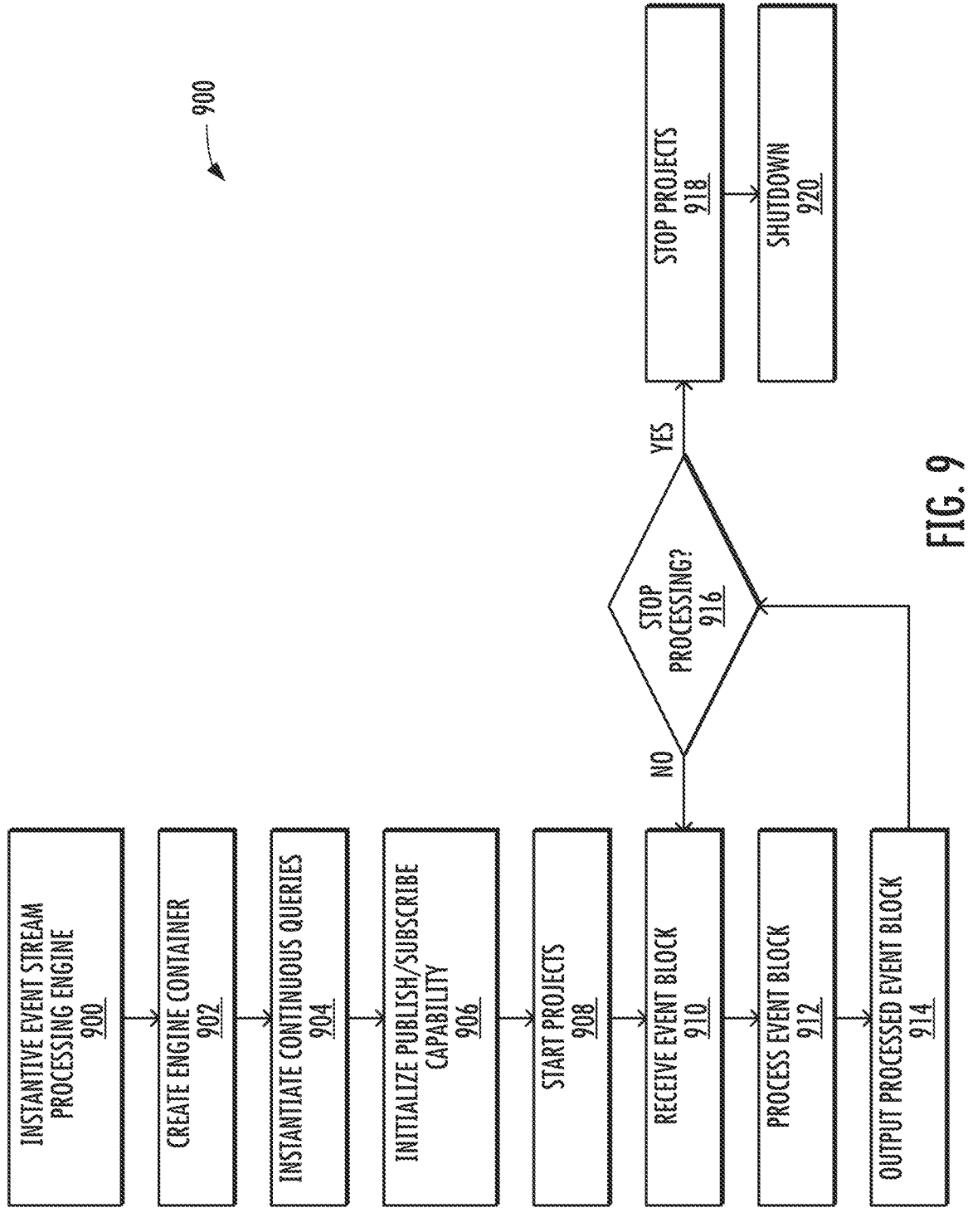
FIG. 9 illustrates a flow chart showing an example process including operations performed by an event stream processing engine, according to some embodiments of the present technology.
Figure 10:
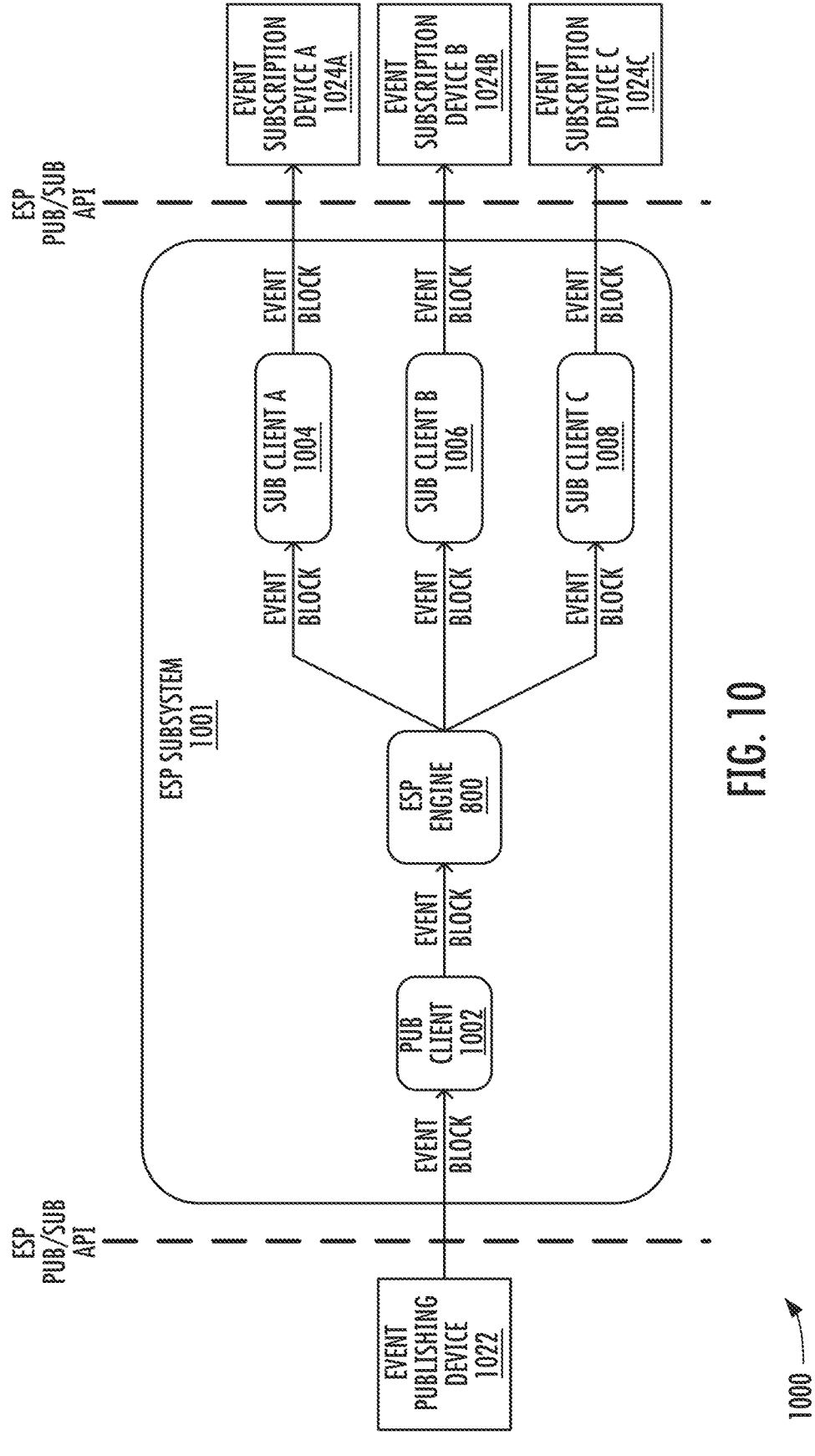
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLU-ETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IOT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
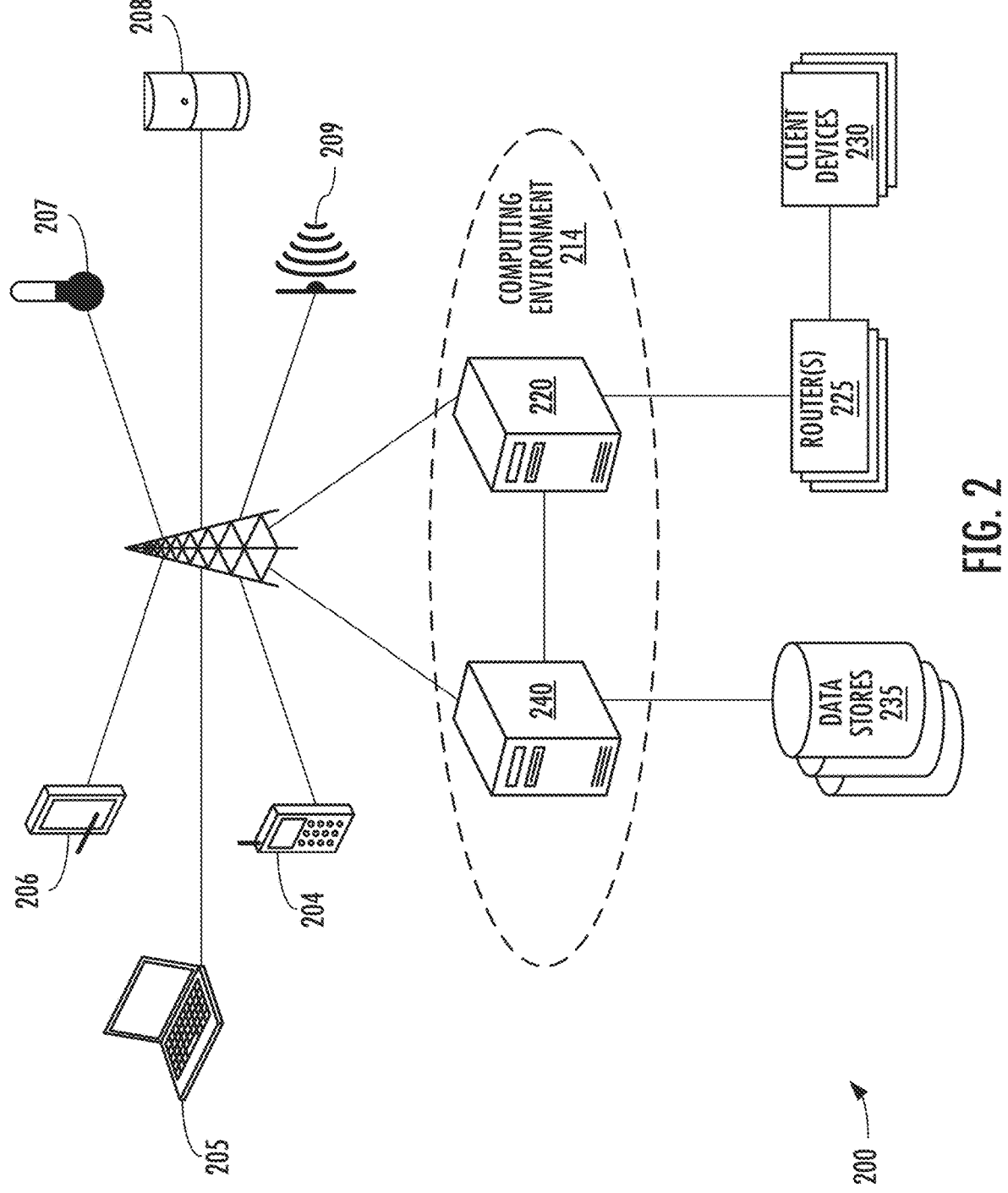
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
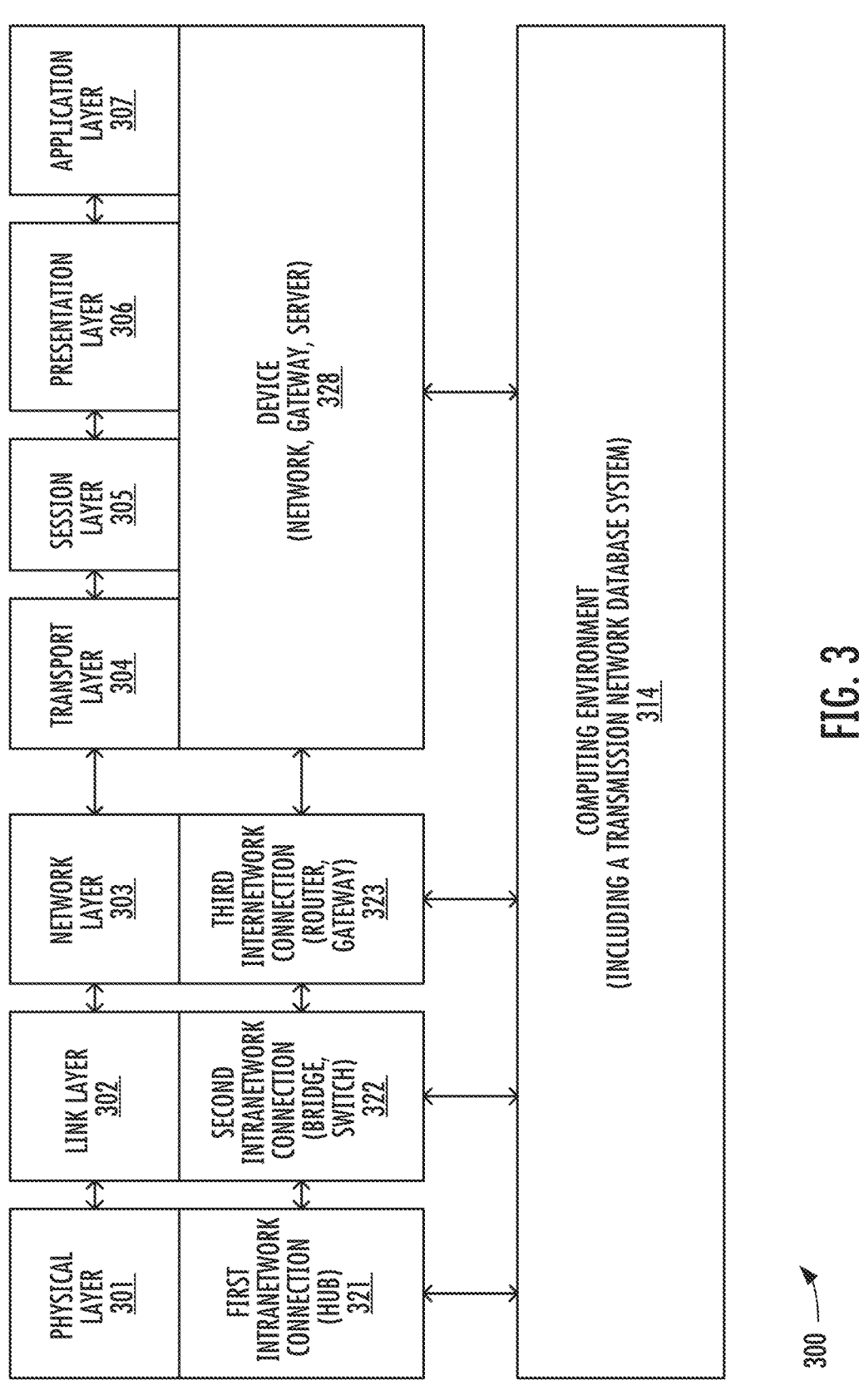
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
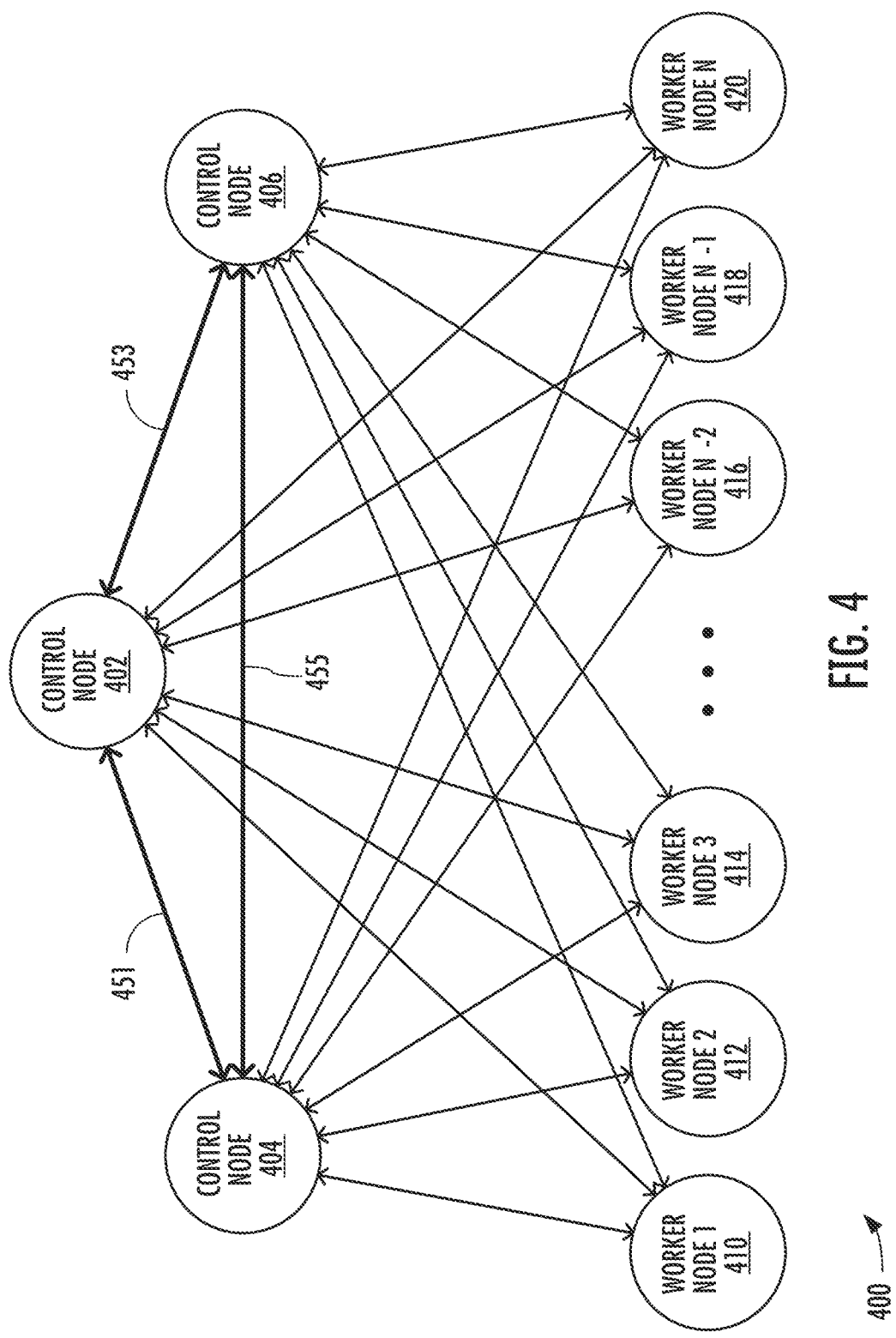
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
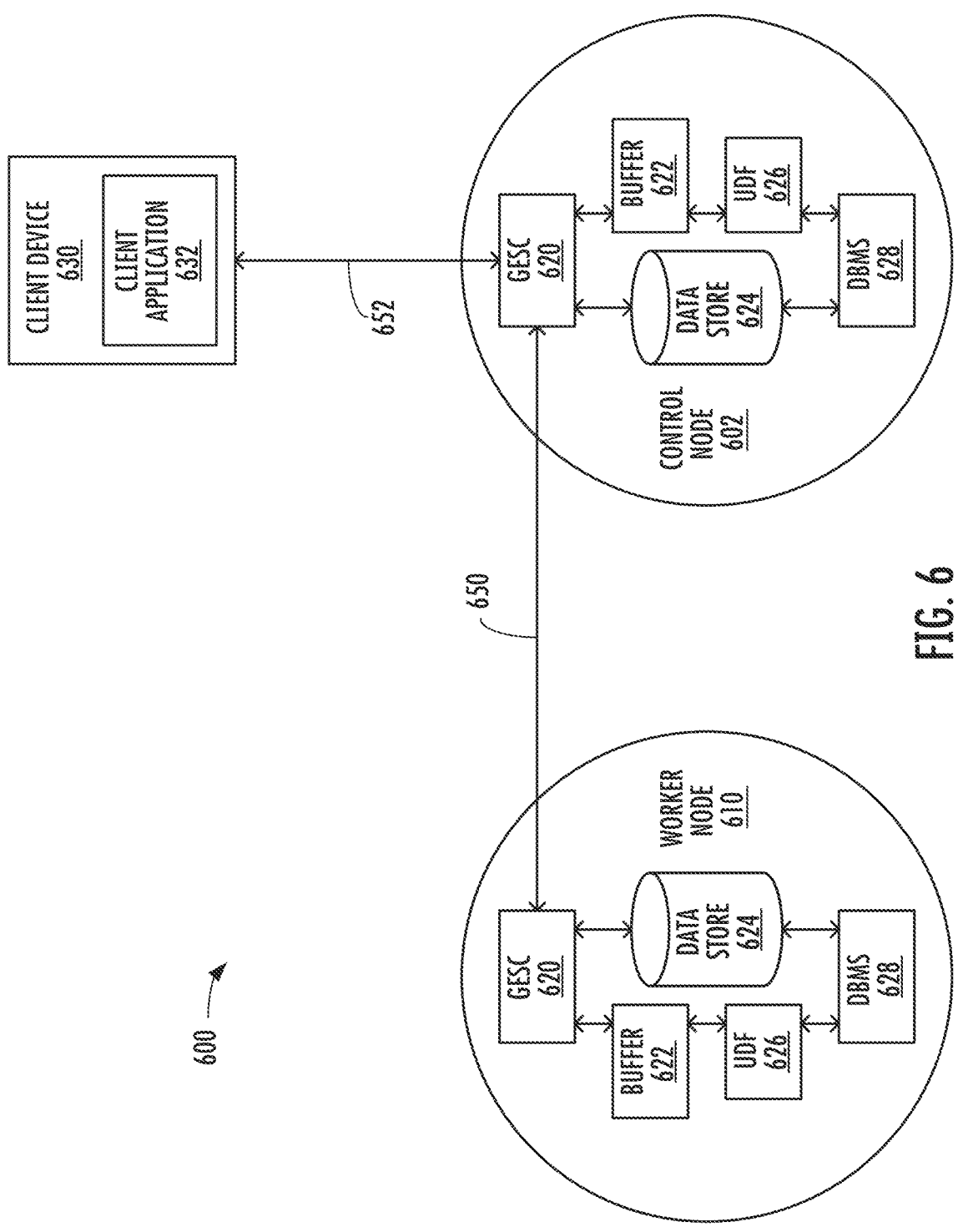
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
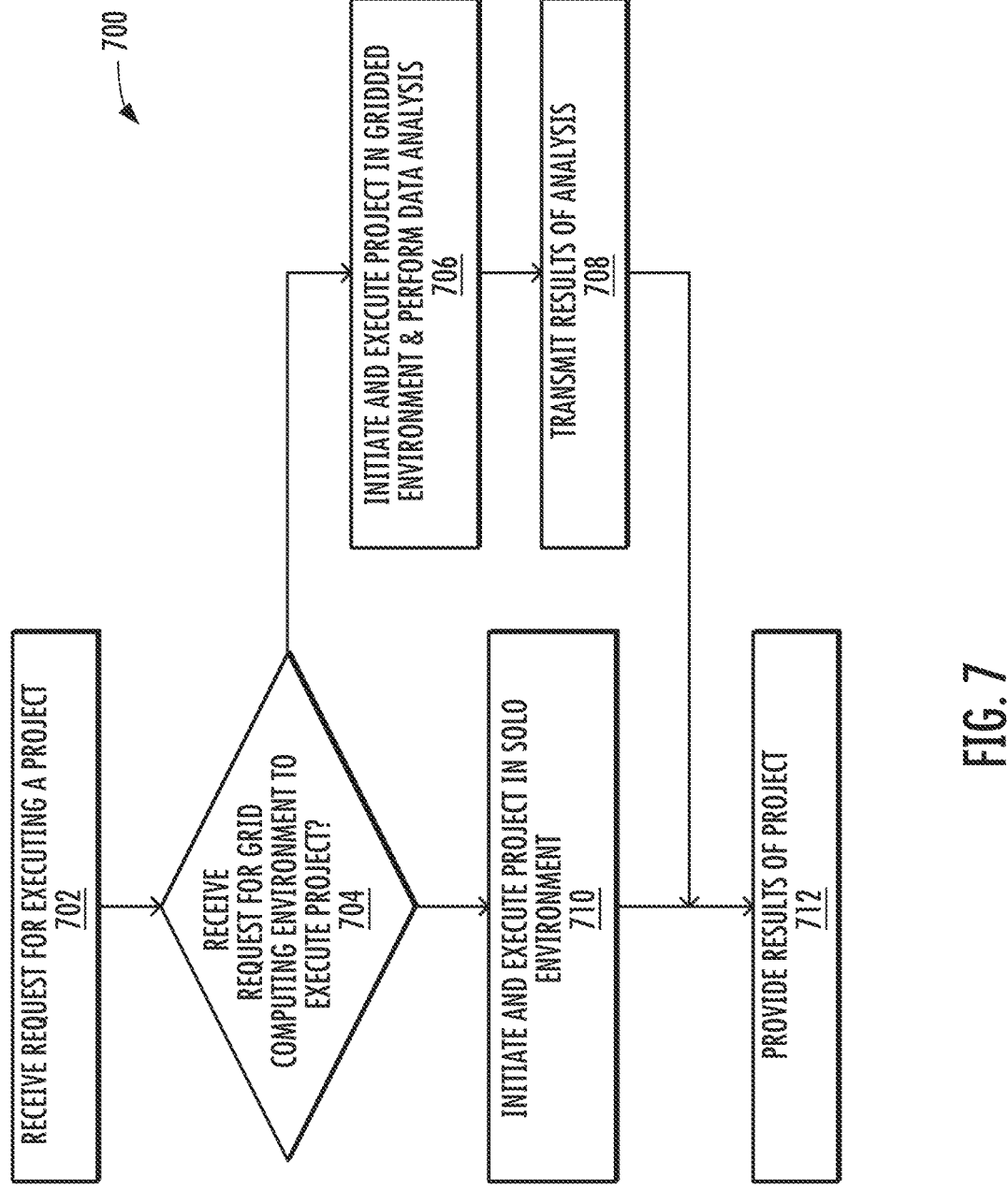
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 851, event publishing device 1022, an event subscribing device A 1024a, an event subscribing device B 1024b, and an event subscribing device C 1024c. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
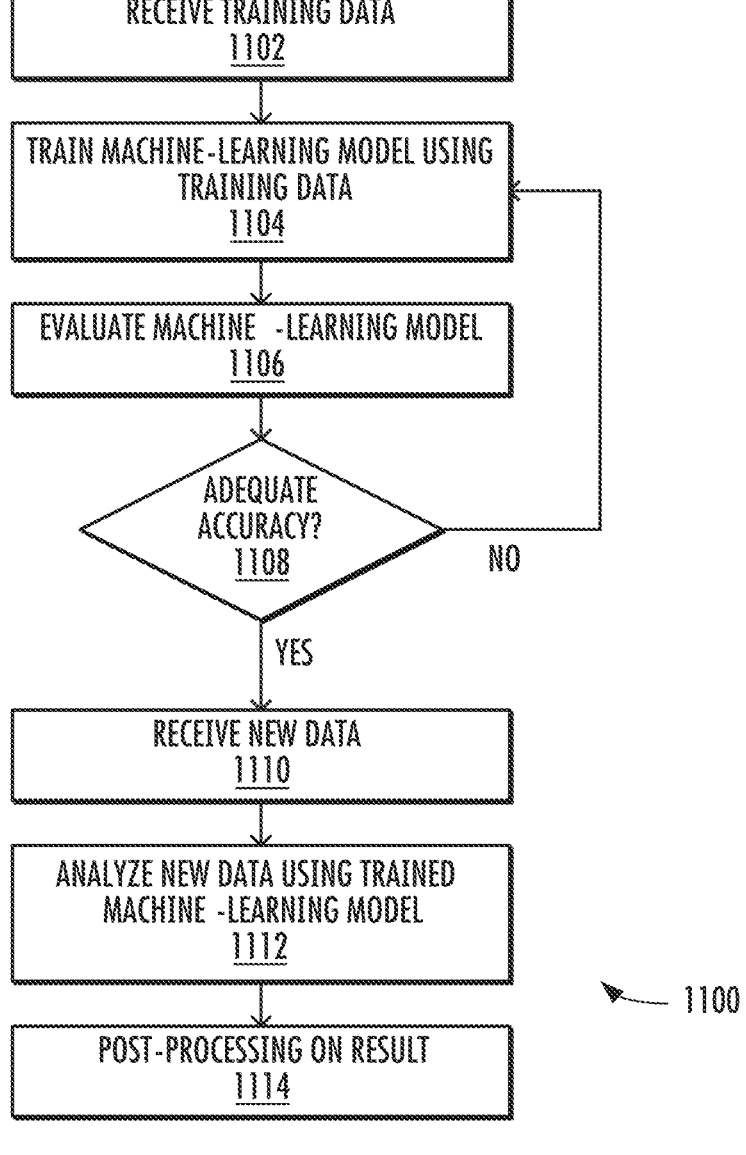
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108. the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
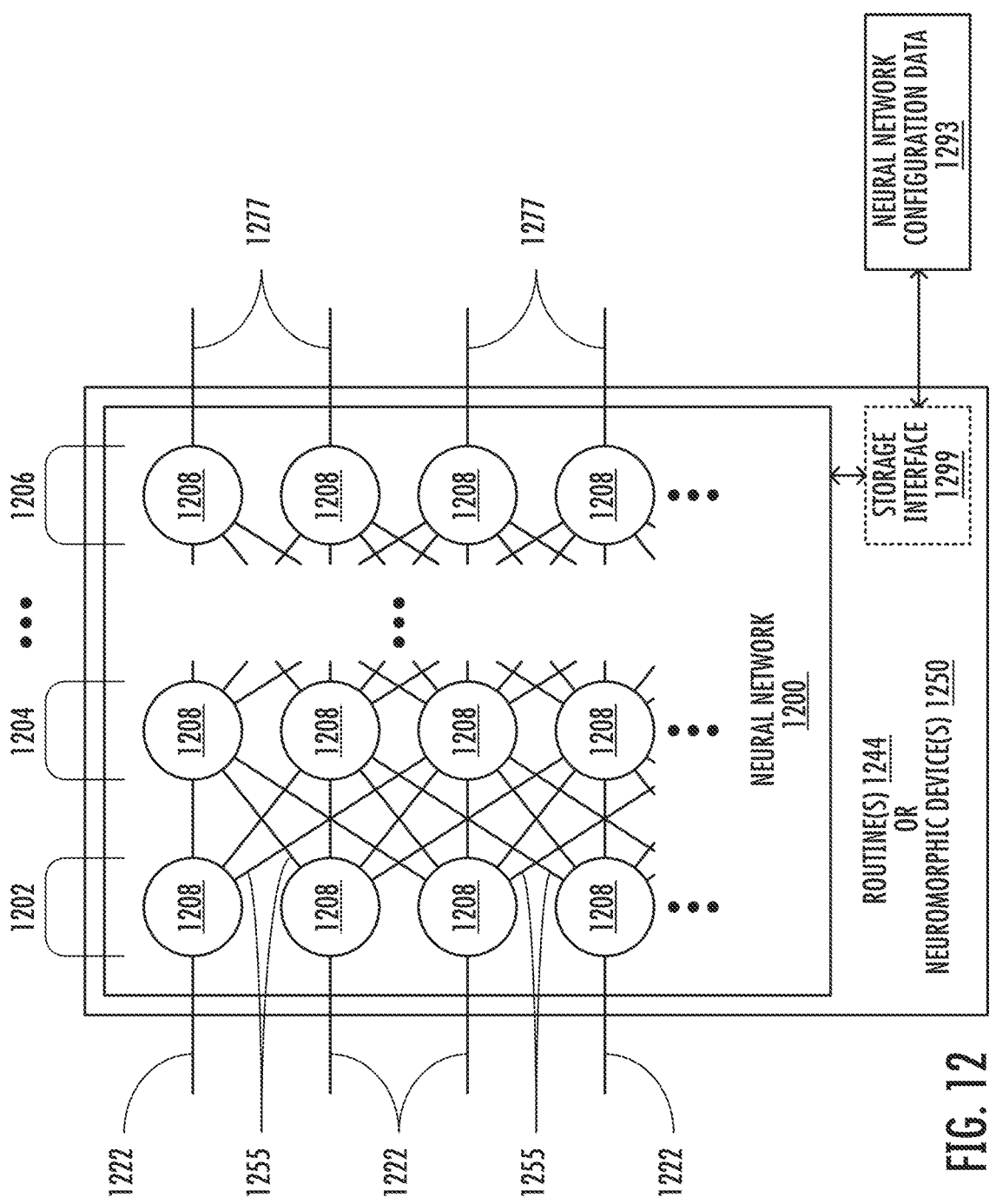
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated theramong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation y=max (x, 0) where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
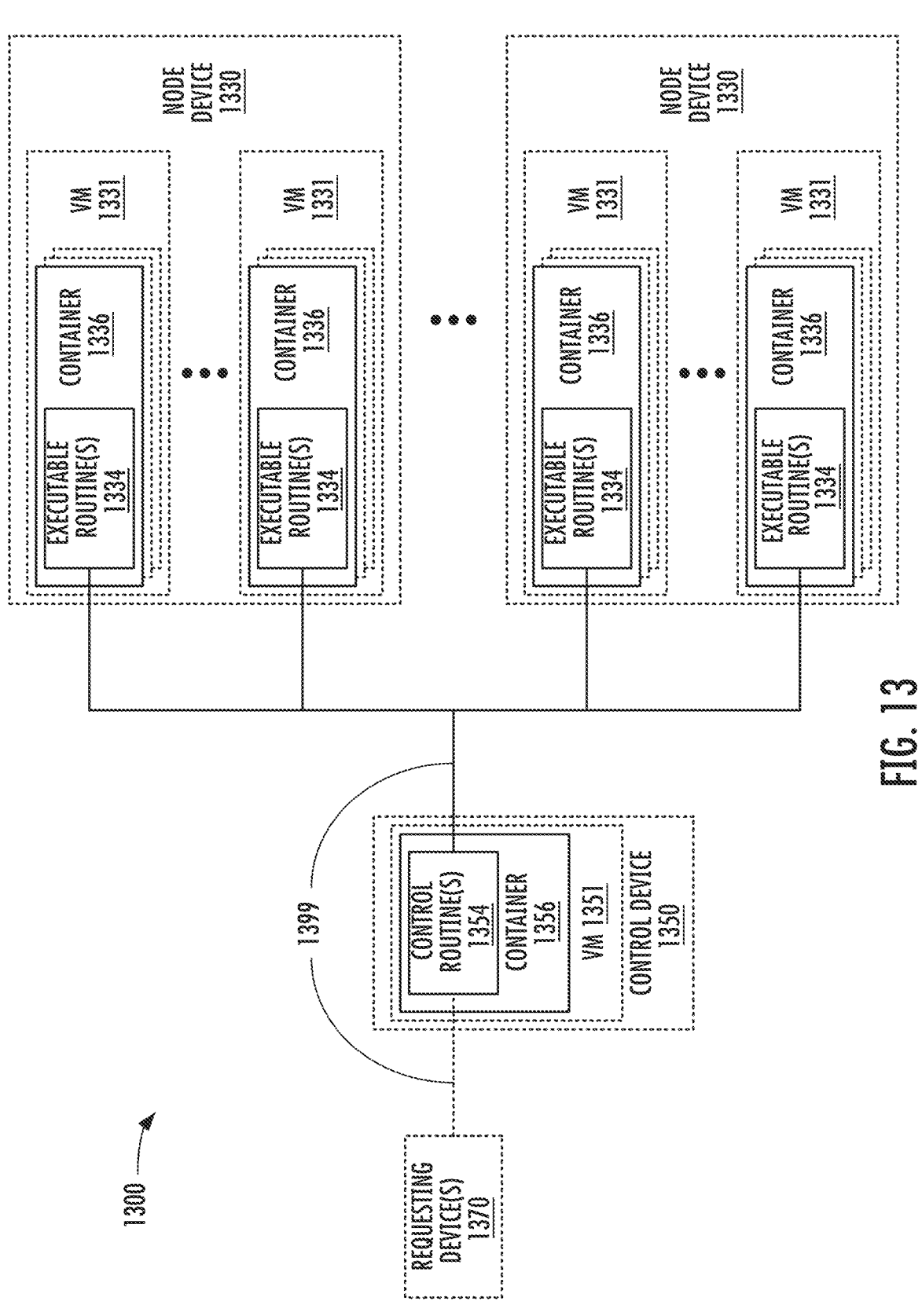
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the afore-described example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

Figure 14:
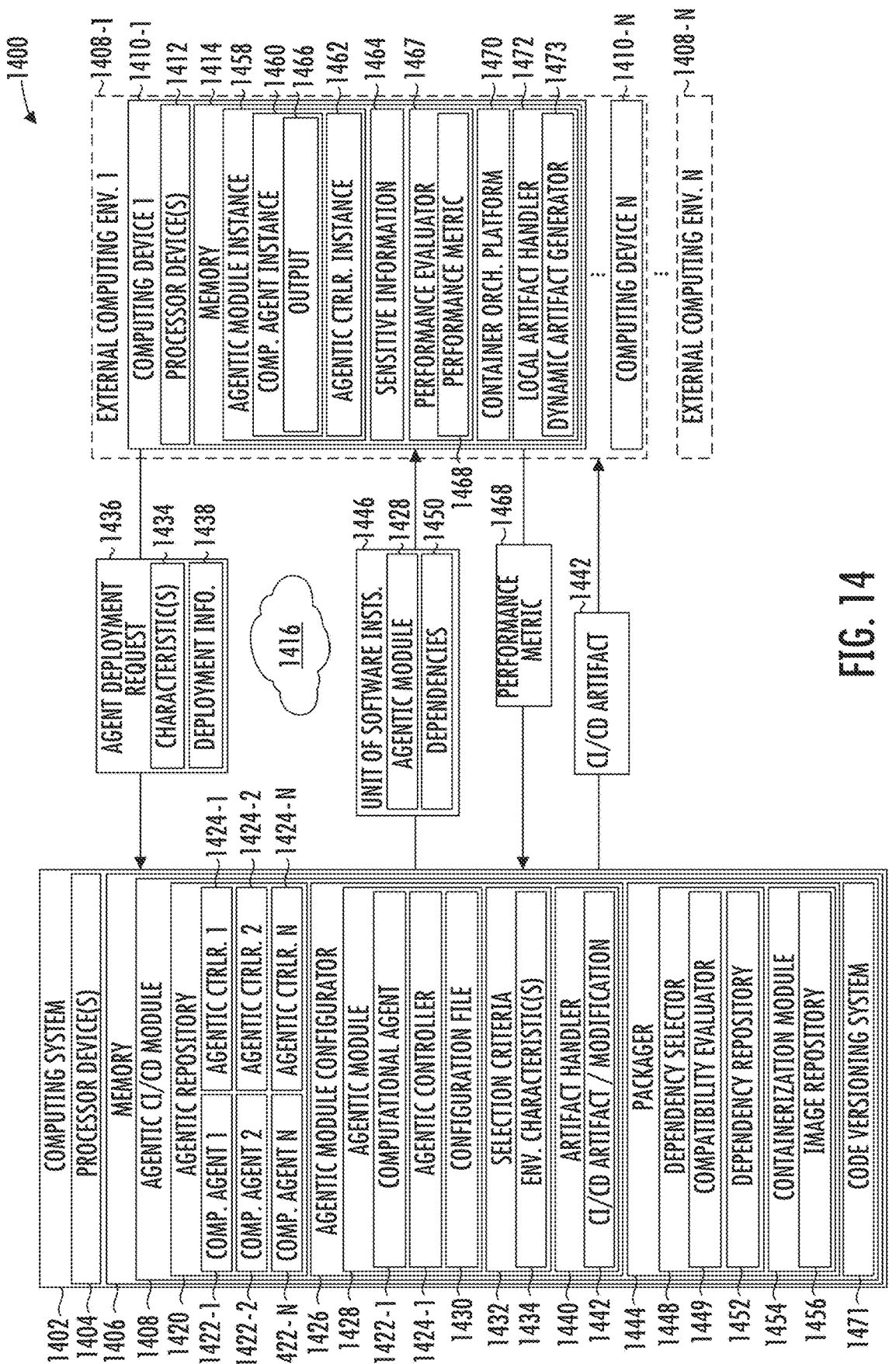
FIG. 14 is a block diagram of a computing environment suitable for implementing privacy preserving Continuous Integration/Continuous Delivery (CI/CD) via remotely deployed agents according to some implementations of the present disclosure.

FIG. 14 is a block diagram of a computing environment 1400 suitable for implementing privacy preserving CI/CD via remotely deployed agents according to some implementations of the present disclosure. A computing environment

1400 can include a computing system 1402 with a processor device 1404 and a memory 1406. As described herein, the "computing environment" 1400 can be any type or manner of computing environment (e.g., a collection of computing devices, systems, and related infrastructure associated with a particular entity or organization) in which data is processed or filtered. It should be noted that the processor device 1404 is illustrated as a single processing device to more clearly illustrate certain multi-threaded aspects of the present disclosure. However, in some implementations, the processor device 104 may be one of a plurality of processor devices of the computing system 1402.

In some implementations, the computing system 1402 may be a computing system or computing apparatus that includes multiple computing devices. Alternatively, in some implementations, the computing system 1402 may be one or more computing devices within a computing system that includes multiple computing devices. Similarly, the processor device(s) 1404 may include any computing or electronic device capable of executing software instructions to implement the functionality described herein.

The memory 1406 can be or otherwise include any device(s) capable of storing data, including, but not limited to, volatile memory (random access memory, etc.), non-volatile memory, storage device(s) (e.g., hard drive(s), solid state drive(s), etc.). In some implementations, the memory 1406 can include a containerized unit of software instructions (i.e., a "packaged container"). The containerized unit of software instructions can collectively form a container that has been packaged using any type or manner of containerization technique. In particular, the memory 1406 can be, or include, a thread-safe memory resource shared by multiple threads of the processor device 1404. For example, portion(s) of the memory 1406 may be allocated to resource pools as thread-safe memory resources.

A containerized unit of software instructions can include one or more applications, and can further implement any software or hardware necessary for execution of the containerized unit of software instructions within any type or manner of computing environment. For example, the containerized unit of software instructions can include software instructions that contain or otherwise implement all components necessary for process isolation in any environment (e.g., the application, dependencies, configuration files, libraries, relevant binaries, etc.).

In some implementations, the computing environment 1400 can include multiple types of nodes. As described herein, a "node" generally refers to a discrete unit of hardware and/or software resources. In some instances, nodes within the computing environment 1400 can be configured to perform specific tasks. For example, some nodes within the computing environment 1400 can be configured as "compute" or "processing" nodes that handle processing tasks or provide processing-heavy services. Compute nodes are generally allocated with hardware devices that can facilitate processing tasks, such as Graphics Processing Units (GPUs), Central Processing Units (CPUs), Application-specific Integrated Circuits (ASICs), Field-Programmable Gate Arrays (FPGAs), etc.

Conversely, storage nodes can be allocated with hardware devices to facilitate storage tasks, such as storage devices (e.g., hard drives, etc.), memory, high-bandwidth network devices, physical storage media, etc. It should be noted that in some instances, storage nodes can include processing devices (e.g., CPUs, etc.) to facilitate storage operations (e.g., read/write operations) and processing nodes can include storage devices (e.g., random access memory) to facilitate processing operations.

In particular, the computing environment 1400 can include external computing environments 1408-1-1408-N (generally, external computing environments 1408). The external computing environments 1408 can be environments (e.g., a corporate network environment, a cloud computing environment, one or more computing systems or server systems, etc.) associated with particular entities (e.g., an organization, a company, a government, a user, etc.). The computing system 1402 can be located separately from the external computing environments 1408. More specifically, the computing system 1402 can be considered "external" to the external computing environments 1408. For example, the computing system 1402 may be a computing system within the internal computing environment of a development organization that develops software applications, or may be a computing system that implements a code versioning system for such an organization. The external computing environment 1408 may be a computing environment associated with an entity that uses a software application developed by the development organization (e.g., a "client" of the development organization).

The external computing environment 1408-1 can include computing devices 1410-1-1410-N (generally, computing devices 1410). The computing devices 1410 can include processor device(s) and memory(s). For example, the computing device 1410-1 can include processor device(s) 1412 and memory 1414 as described with regards to the processor device(s) 1404 and memory 1406 of the computing system 1402, respectively.

Because the computing system 1402 is external to the external computing environment 1408, the computing system must communicate with computing devices within the external computing environment via a network 1416. When communicating with computing device(s) or system(s) located within the external computing environment 1408, the computing system 1402 may be restricted to certain communication channels over the network 1416, such as particular sockets or Application Programming Interfaces (APIs). For example, assume that the external computing environment 1408-1 is a cloud computing environment implemented by a particular cloud service provider. The computing system 1402 may access the external computing environment 1408-1 via access credentials furnished for the computing system 1402 by the cloud service provider at the behest of the organization associated with the external computing environment 1408-1.

It should be noted that, in some implementations, some (or all) of the external computing environments 1408 may be implemented by a different entity. For example, the external computing environment 1408-1 may be implemented by one organization that subscribes to software services provided by the organization associated with the computing system 1402, while the external computing environment 1408-N is implemented by a different organization that subscribes to the same software services. Alternatively, in some implementations, some portion (or all) of the external computing environments 1408 may be implemented by the same entity. For example, the external computing environment 1408-1 and the external computing environment 1408-2 may be instances of the same external computing environment.

Similarly, it should be noted that, in some implementations, the computing device(s) 1410 included in one external computing environment may be different than the devices included in a different environment. Additionally, or alternatively, in some implementations, multiple computing devices within the same external computing environment may be different, or may possess different characteristics. For example, the processor device(s) 1412 of the computing device 1410-1 may use an x86 instruction set architecture (ISA) while processor device(s) of the computing device 1410-N use a RISC-V ISA.

Returning to the computing system 1402, the memory 1406 can include an agentic CI/CD module 1418. The agentic CI/CD module 1418 can perform various operations to manage building, remotely deploying maintaining, monitoring, etc. of agentic modules for external computing environments. To do so, the agentic CI/CD module 1418 can include an agentic repository 1420. The agentic repository 1420 can include a plurality of computational agents 1422-1-1422-N (generally, computational agents 1422). The agentic repository 1420 can further include a plurality of agentic controllers 1424-1-1424-N (generally, agentic controllers 1424).

Each of the computational agents 1422 can be, or otherwise include, a deployable unit of software instructions (e.g., a process, a function, a program, an application, a machine-learned model, etc.) that performs computational tasks with client-specific information stored to the external (i.e., client) computing environment. For example, the computational agents 1422 may perform a statistical analysis of a dataset stored to the external computing environment. For another example, the computational agents 1422 may be one or more machine-learned models trained to process data, or perform certain tasks by processing data.

In some implementations, the computational agents 1422 can be configured to perform different tasks. In other words, some of the computational agents 1422 can perform different computational tasks than others. For example, the computational agent 1422-1 may be an agent associated with a particular "tier" of service with a corresponding set of features, while the computational agent 1422-2 may be an agent associated with a different "tier" of service with a different corresponding set of features. For another example, the computational agent 1422-1 may be configured to perform a certain set of tasks (e.g., language-related tasks, such as text generation), while the computational agent 1422-2 may be configured to perform a different set of tasks (e.g., image generation, audio generation, classification, etc.).

In some implementations, some (or all) of the tasks the computational agents 1422 are configured to perform include decision operations in which the computational agent evaluates the information stored within the external computing environment based on one or more criteria. For example, the computational agent 1422-1 may receive a set of inputs related to a user navigating to a web page. The computational agent 1422-1 can evaluate the set of inputs based on criteria to select one of a plurality of content items (e.g., media, etc.) to serve the user. In some implementations, the criteria evaluated by the computational agent 1422-1 can be modified using a CI/CD pipeline (e.g., to change existing criteria, remove criteria, add criteria, etc). For example, assume that, based on user feedback, the external computing environment 1408-1 determines that the computational agent 1422-1 is providing content items at a higher frequency than desired. Based on the feedback, developers associated with the computational agent 1422-1, or developers associated with the external computing environment 1408-1, can create a CI/CD artifact that modifies the criteria such that the computational agent 1422-1 will provide content items at a reduced frequency.

As described previously, in some implementations, the computational agents can be, or include, one or more machine-learned models. Specifically, in some implementations, the computational agent 1422-1 may include a large foundational model (LFM) trained to perform multiple types of tasks, and/or multimodal tasks (e.g., processing a prompt and a corresponding image input to generate an output, etc.). For example, the computational agent 1422-1 may be a large language model (LLM) instantiated within the external computing environment 1408-1 that is trained to autonomously fulfill requests from users within the external computing environment 1408-1.

The agentic controllers 1424 can be deployed to external computing environments alongside the computational agents 1422. The agentic controllers 1424 can manage the computational agents 1422 within the external computing environment(s) 1408. As described herein, an "agentic controller" can refer to a deployable unit of software instructions that is configured to manage agentic controllers within external computing environments. For example, the agentic controllers 1424 can receive and provide inputs to the computational agents 1422 (e.g., specific portions of client data), route outputs from the computational agent 1422 to requestors, etc.

In particular, the agentic controllers 1424 can implement CI/CD processes within the external computing environment 1408-1 by regularly checking for CI/CD artifact availability from the computing system 1402. For example, the agentic controllers 1424 can receive a CI/CD artifact (i.e., update, modification, etc.) for the computational agents 1422 by pinging an API of a code versioning system. The agentic controllers 1424 can then directly apply the CI/CD artifact to the computational agents 1422 without needing explicit permission from the external computing environment 1408-1.

In some implementations, one of the agentic controllers 1424 may be deployed to supervise, or otherwise manage, a plurality of computational agents 1422. For example, assume that the computational agent 1422-1 is configured to perform statistical analysis tasks and the computational agent 1422-2 is configured to perform text generation tasks. The agentic controller 1424 can perform initial processing of a request to determine whether the request should be provided to the computational agent 1422-1, the computational agent 1422-2, or both (and which order they should receive the input). The agentic controller 1424 can also facilitate communication between the computational agents 1422-1 and 1422-2.

Additionally, or alternatively, in some implementations, multiple agentic controllers 1424 may be deployed to supervise or manage a single computational agent 1422. For example, assume that the computational agent 1422-1 is a LLM trained to perform multiple types of tasks. The agentic controller 1424-1 may be deployed to evaluate the accuracy of statistical analysis outputs generated by the computational agent 1422-1, while the agentic controller 1424-2 may be deployed to evaluate the tone and style of the computational agent 1422-1 when generating outputs.

In some implementations, the agentic controllers 1424 can include, or otherwise access, machine-learned models. For example, the agentic controller 1424 may be or otherwise include an LFM capable of evaluating or reviewing the output generated by a computational agent 1422 being supervised by the agentic controller 1424. For another example, the agentic controller 1424 may include an LFM capable of processing requests to select a particular computational agent to which the request should be routed.

In some implementations, the agentic controller 1424 can segment a request into discrete tasks, and assign the tasks to specific computational agent(s) 1422. In some implementations, the agentic controller 1424 can generate task assignment information that assigns the discrete tasks to corresponding computational agents. The task assignment information can further indicate a sequence in which the tasks should be performed. It should be noted that any operations described as being performed by the agentic controllers 1424 may also be performed by the computational agents 1422. More specifically, in some implementations, the computational agents 1422 may be self-managing agents that can perform the operations described herein with regards to the agentic controllers 1424 to manage themselves.

The agentic CI/CD module 1418 can include an agentic module configurator 1426. The agentic module configurator 1426 can configure an agentic module 1428 for deployment to the external computing environment 1408-1. The agentic module 1428 can include one or more of the computational agents 1422-1 and one or more of the agentic controllers 1424. The agentic module 1428 can also include a configuration file 1430. To configure the agentic module 1428 for deployment, the agentic module configurator 1426 can select the computational agent 1422-1 and the agentic controller 1424-1 for inclusion in the agentic module 1428.

In some implementations, the computational agent 1422-1 and the agentic controller 1424-1 can be selected based on selection criteria 1432 evaluated by the agentic module configurator 1426. In some implementations, the selection criteria can include a service "tier" or the like associated with the external computing environment 1408-1 (or the entity that implements the environment). For example, the organization or entity associated with the external computing environment 1408-1 may subscribe to agentic services implemented via the computing system 1402. The agentic module configurator 1426 can select the computational agent 1422 and the agentic controller 1424 based on the specific agentic services subscribed to by the organization or entity.

In some implementations, the selection criteria 1432 can include environment characteristic(s) 1434. The environment characteristic(s) 1434 can refer to characteristics of the computing environment to which the agentic module 1428 is to be deployed, such as the external computing environment 1408-1. For example, the environment characteristic(s) 1434 may include information descriptive of computing resources available within the external computing environment 1408-1 (e.g., a processor architecture used in the external computing environment 1408-1, a particular type of database used for storage, a quantity of resources available within the environment, etc.). For another example, the environment characteristic(s) 1434 may include capabilities of components installed within the external computing environment 1408-1 (e.g., encoding capabilities, decoding capabilities, quantum computing capabilities, average compute resource availability, average bandwidth availability, known models accessible within the environment, etc.). For another example, the environment characteristic(s) 1434 may include an indication of physical location(s) of hardware that implements the external computing environment 1408-1. For yet another example, the environment characteristic(s) 1434 may include an indication of a particular service (e.g., a particular cloud service or cloud service architecture) used to implement the external computing environment 1408-1.

In some implementations, the selection criteria 1432, and/or the environment characteristic(s) 1434, can be received previously from the computing device 1410-1 or a different computing device within the external computing environment 1408-1. Alternatively, in some implementations, the environment characteristic(s) 1434 can be included in an agent deployment request 1436 received from the external computing environment 1408-1.

More specifically, the agentic CI/CD module 1418 can receive the agent deployment request 1436 for the external computing environment 1408-1. The agent deployment request can request deployment of an agentic module, such as the agentic module 1428, within the external computing environment 1408-1. In some implementations, the agent deployment request 1408-1 can be received from a computing device within the external computing environment 1408-1, such as the computing device 1410-1.

In some implementations, the agent deployment request 1436 can specify one or more external computing environments 1408-1 in which to deploy the agentic module 1428. For example, the agent deployment request 1436 may specify that the agentic module 1428 be deployed to the external computing environment 1408-1. For another example, the agent deployment request 1436 may specify that the agentic module 1428 be deployed to both the external computing environment 1408-1 and the external computing environment 1408-2.

In some implementations, the agent deployment request 1436 can include some (or all) of the environment characteristics 1434. Examples of environment characteristics 1434 included in the agent deployment request 1436 can include an identity of a cloud computing platform that implements the external computing environment 1408-1, a type of hardware architecture associated with the external computing environment 1408-1 (e.g., an x86 processor architecture, a RISC-V processor architecture, etc.), a type of operating system associated with the external computing environment 1408-1, computing resources available within the external computing environment 1408-1, security requirements associated with the external computing environment 1408-1, operating requirements associated with the external computing environment 1408-1, etc.

For example, the agent deployment request 1436 for the external computing environment 1408-1 can include environment characteristics 1434 that identify a particular type of processor architecture used in the external computing environment 1408-1, available computing resources, minimum requirements for deployment (e.g., security certifications, encrypted communication capabilities, sensitive data handling assurances, etc.), etc. In some implementations, if the agent deployment request 1436 requests deployment of the agentic module 1428 to multiple computing environments, the agent deployment request 1436 can include environment characteristics 1434 for multiple environments. For example, the environment characteristics 1434 may indicate that a particular cloud service or cloud architecture is used to implement the external computing environment 1408-1 while a different cloud service or architecture is used to implement the external computing environment 1408-2.

In some implementations, the agent deployment request 1436 can include deployment information 1438. The deployment information 1438 can include information used when deploying the agentic module 1428 within an external computing environment such as the external computing environment 1408-1. For example, the deployment information 1438 may specify a particular target within the external computing environment 1408-1 for deployment of the agentic module 1428 (e.g., a file location, an identifier for a particular machine or group of resources, a mount point for a container image, an address for an internal container repository (i.e., internal to the external computing environment 1408-1), etc.). For another example, the deployment information 1438 may suggest, or require, certain dependencies be included in the agentic module 1428 when being packaged for deployment to the external computing environment 1408-1.

In some implementations, the deployment information 1438 may include access credentials for the external computing environment 1408-1 so that the agentic CI/CD module 1418 can deploy the agentic module 1428 to the external computing environment 1408-1. For example, the access credentials may be access credentials used to access a cloud computing platform on which the external computing environment 1408-1 is hosted. For another example, the access credentials may be access credentials required to access a communication protocol such as File Transfer Protocol (FTP) or the like.

The agentic module configurator 1426 can include an artifact handler 1440. The artifact handler 1440 can create, obtain, evaluate, implement, and/or transmit CI/CD artifacts, such as a CI/CD artifact 1442, to implement CI/CD processes remotely within the external computing environment 1408-1 via the agentic module 1428 once deployed. As described herein, "CI/CD" refers to a development "process" or a set of practices that automate the integration, testing, and deployment of software modifications. Developers following CI/CD processes create and apply software updates at a much higher frequency than more conventional development processes, with some CI/CD developers applying updates multiple times per day.

Typically, CI/CD processes are not utilized for software deployed to computing environments external to the environment in which the software is developed (e.g., a client environment such as the external computing environment 1408-1). This is because client environments such as the external computing environment 1408-1 often lack the capabilities to apply CI/CD "artifacts" (i.e., updates, modifications, patches, configuration changes, etc.) at a required frequency. Further, CI/CD processes generally create CI/CD "artifacts" based on an evaluation of the "performance" of the software while deployed. However, when the software is deployed for processing sensitive data within the external computing environment, developers are not allowed to evaluate the performance of the deployed software so that the sensitive data remains protected. In turn, these restrictions further exacerbate the difficulties of applying CI/CD processes to externally deployed software.

However, the agentic module 1428 can autonomously retrieve CI/CD artifacts from outside the external computing environment 1408-1 and apply CI/CD artifacts within the external computing environment 1408-1, therefore enabling the application of CI/CD processes to software deployed to external computing environments. Further, the agentic module 1428 can "self-evaluate" processing performance and report performance to the agentic CI/CD module 1418 without exposing the sensitive information. Obtainment, management, and application of the CI/CD artifact 1442 will be discussed subsequently.

The agentic CI/CD module 1418 can include a packager 1444. The packager 1444 can generate a unit of software instructions 1446 that, when executed, instantiates the agentic module 1428 within the external computing environment 1408-1. As described herein, a "unit of software instructions" can refer to a binary, an executable, a container image, a "package" (e.g., the agentic module 1428 and a set of dependencies, etc.), or any other type of instructions that can be executed to instantiate the agentic module 1428 within a computing environment. In some implementations, the unit of software instructions 1446 can include the agentic module 1428 (or a packaged, compiled, containerized, etc. version thereof). Alternatively, in some implementations, the unit of software instructions 1446 can be an address from which the agentic module 1428 can be retrieved.

In some implementations, the packager 1444 can include a dependency selector 1448. The dependency selector 1448 can select dependencies 1450 for inclusion in the unit of software instructions 1446 for the agentic module 1428 from a dependency repository 1452. For example, the dependency repository 1452 may be a container image repository, and the dependency selector 1448 may select the dependencies 1450 by selecting container image layers for inclusion in a container image storing the agentic module 1428. For another example, the dependency repository 1452 may be a package repository that stores and indexes dependencies, and the packager 1444 may generate a build file or build directory that specifies the dependencies to be included in the unit of software instructions 1446.

In some implementations, the dependency selector 1448 can include a compatibility evaluator 1449. The compatibility evaluator 1449 can evaluate the dependencies 1450 for compatibility with the external computing environment 1408-1 based on the environment characteristics 1434. For example, the environment characteristic(s) 1434 can include security requirements associated with the external computing environment 1408-1, and the compatibility evaluator 1449 can determine, for each of the dependencies 1450, that the dependency is compatible with the security requirements associated with the external computing environment 1408-1. For another example, the environment characteristic(s) 1434 can include the type of operating system associated with the external computing environment 1408-1, and the compatibility evaluator 1449 can determine, for each of the dependencies 1450, that the dependency is compatible with the type of operating system associated with the external computing environment 1408-1.

In some implementations, the packager 1444 can include a containerization module 1454. The containerization module 1454 can create a container image (e.g., the unit of software instructions 1446) that can be mounted within the external computing environment 1408-1 to instantiate the agentic module 1428. In some implementations, the containerization module 1454 can include an image repository 1456. The image repository 1456 can store a container image each time a CI/CD artifact is deployed to a "current" container image for the agentic module 1428. In this manner, the image repository 1456 can serve as a "backup" for prior versions of the agentic module 1428 prior to deployment of CI/CD artifacts.

The agentic CI/CD module 1418 can determine where to send the unit of software instructions 1446 based on the agent deployment request 1436. In some implementations, the agent deployment request 1436 can request deployment to multiple computing devices within the same computing environment. For example, the agent deployment request may request deployment of the agentic module 1428 to the computing device 1410-1 and the computing device 1410-N within the external computing environment 1408-1.

Additionally, or alternatively, in some implementations, the agent deployment request 1436 can request deployment to multiple computing devices within the different computing environments. For example, the agent deployment request may request deployment of the agentic module 1428 to the computing device 1410-1 within the external computing environment 1408-1 and to a computing device (not illustrated) within the external computing environment 1408-N. In some implementations, the packager 1444 can generate a second unit of software instructions (not illustrated) for deployment of the agentic module 1428 to a different external computing environment. For example, the unit of software instructions 1446 for the external computing environment 1410-1 can include the dependencies 1450 based on the cloud service provider for the external computing environment 1408-1. If the external computing environment 1408-N is implemented using a different cloud service provider, the second unit of software instructions can include a second set of dependencies different than the dependencies 1450. In some implementations, the different units of software instructions can be packaged differently. For example, the unit of software instructions 1446 may be a containerized unit of software instructions (e.g., a container image) while the second unit of software instructions (not illustrated) can be a packaged unit of software instructions.

The computing device 1410-1 can receive the unit of software instructions 1446. The computing device 1410-1 can then execute the unit of software instructions 1446 to instantiate an agentic module instance 1458 within the external computing environment 1408-1. The agentic module instance 1458 can include a computational agent instance 1460 and an agentic controller instance 1462. The computational agent instance 1460 can be an instance of one of the computational agents 1422 selected for inclusion in the agentic module 1428. Similarly, the agentic controller instance 1462 can be an instance of one of the agentic controllers 1424 selected for inclusion in the agentic module 1428.

The memory 1414 of the computing device 1410-1 can include sensitive information 1464. The sensitive information 1464 can refer to any type of information to which access is mediated (e.g., client information, customer information, etc.). The computational agent instance 1460 can process the sensitive information 1464 to generate an output 1466. For example, the computational agent instance 1460 may be or otherwise include a machine-learned model, and may process the sensitive information 1464 to generate a model output. For another example, the computational agent instance 1460 may process the sensitive information 1464 to convert the sensitive information 1464, modify the sensitive information 1464, analyze the sensitive information 1464, etc.

In some implementations, the computing device 1410-1 can include a performance evaluator 1467. The performance evaluator 1467 can determine a performance of the computational agent instance 1460 based on an evaluation of the output 1466. For example, the performance evaluator 1467 may access a "ground truth" output (e.g., an output known to be accurate or otherwise "correct") and compare the ground truth output to the output 1466. For another example, the performance evaluator 1467 may compare the output 1466 to the output of another computational agent, another deployed software package, etc.

The performance evaluator 1467 can generate a performance metric 1468 related to the processing of the sensitive information 1464 by the computational agent instance 1460 to generate the output 1466. For example, the performance metric 1468 may describe an amount of time taken to generate the output 1466, an amount of computing resources used to compute the output 1466, an accuracy associated with the output 1466, user feedback associated with the output 1466, etc. The performance metric 1468 can be configured such that none of the sensitive information 1464 is included in the performance metric 1468 and cannot be "reverse engineered" or otherwise derived from the performance metric 1468. For example, assume that the sensitive information 1464 includes health records for patients of a hospital. The performance metric 1468 can be configured such that any indication of performance for a specific record or type of record is anonymized and obscured. In such fashion, implementations described herein enable performance information related to the computational agent instance 1460 to be safely transmitted outside the external computing environment 1408-1 without risking exposure of the sensitive information 1464.

It should be noted that the performance metric 1468 is described with regards to the output 1466 only to more clearly illustrate various implementations of the present disclosure. Rather, in some implementations, the performance metric 1468 can be based on a set of outputs from the computational agent instance 1460 that includes the output 1466. In other words, the performance metric 1468 may describe an "average" performance of the computational agent instance over a period of time. It should be further noted that, in some implementations, the performance metric 1468 may be generated by the agentic controller instance 1462 rather than the performance evaluator 1467. More specifically, in some implementations, the deployed agentic controller instance 1462 can evaluate the output 1466 to generate the performance metric 1468.

In some implementations, the computing device 1410-1 can include a container orchestration platform 1470. The container orchestration platform 1470 can orchestrate deployment of the agentic module 1428 (e.g., instantiation of the computational agent instance 1460 and the agentic controller instance 1462, etc.) when the unit of software instructions 1446 is a container image. For example, the container orchestration platform 1470 can mount the unit of software instructions 1446 to a mount point within the external computing environment 1408-1. In some implementations, the container orchestration platform 1470 can dynamically mount (and/or remove) multiple instances of the container image based on demand.

The agentic controller instance 1462 can obtain the performance metric 1468 and transmit the performance metric 1468 to the agentic CI/CD module 1418. The artifact handler 1440 can obtain the CI/CD artifact 1442 based on the performance metric 1468. For example, assume that the performance metric 1468 indicates slower than anticipated processing speeds for a particular computational operation that the computational agent instance 1460 is configured to perform. In some instances, the CI/CD artifact handler 1440 can autonomously determine and generate the CI/CD artifact 1442 to improve the processing speeds for that particular computational operation. Alternatively, in some instances, a developer of the computational agents 1422 can create the CI/CD artifact 1442 (i.e., a "modification" for the agentic module and/or computational agent) based on the performance metric 1468 and provide the CI/CD artifact 1442 to the artifact handler 1440.

In some implementations, the computational agents 1422 can perform decision operations in which the computational agent evaluates the sensitive information 1464 based on one or more criteria determine whether to provide content to a requesting user, what type of content to provide to a requesting user, etc. The CI/CD artifact 1442 can modify those criteria. For example, assume that the computational agent instance 1460 is an instance of the computational agent 1422-1. Further assume that the computational agent 1422-1 is configured to automatically provide a particular content item to users with requests originating from a particular company. The CI/CD artifact 1442 may modify the computational agent 1422-1 such that the computational agent 1422-1 provides a different content item to users with requests originating from the particular company.

In some implementations, the computational agents 1422 can include a machine-learned model, and the CI/CD artifact 1442 can be an update for the machine-learned model. For example, the CI/CD artifact 1442 may be parameter updates for parameters of the machine-learned model, updates to a prompt provided to the machine-learned model, etc. For another example, the CI/CD artifact 1442 may be an updated version of the same machine-learned model.

In some implementations, the computing system 1402 can include, or can otherwise access, a code versioning system 1471 for the agentic module 1428 (e.g., the computational agents 1422, the agentic controllers 1424, etc.). The code versioning system 1471 can be configured to receive the performance metric 1468 and make the performance metric 1468 accessible to developers of the agentic module 1428. The code versioning system 1471 can also receive the CI/CD artifact 1442 from developers and can provide the CI/CD artifact 1442 to the artifact handler 1440 (e.g., via an API, etc.).

The agentic controller instance 1462 can be configured to regularly query the artifact handler 1440 regarding CI/CD artifact availability. The agentic controller instances 1462 can query the artifact handler 1440, and in response, the artifact handler 1440 can transmit the CI/CD artifact 1442 to the agentic controller instance 1462. The agentic controller instance 1462 can then apply the CI/CD artifact 1442 to the computational agent instance 1460. Alternatively, in some implementations, the CI/CD artifact 1442 can be applied locally to create a new computational agent 1422, and the new computational agent 1422 can be transmitted to the agentic controller instance 1462 for deployment.

In some implementations, the computing device 1410-1 can generate or otherwise obtain the CI/CD artifact 1442 locally. To do so, the computing device 1410-1 (or some other computing device in the external computing environment 1408-1) can include a local artifact handler 1472 that can perform some (or all) of the operations described with regards to the artifact handler 1440. In some implementations, the local artifact handler 1472 may generate the CI/CD artifact 1442 based on a local evaluation of the output 1466. For example, the local artifact handler 1472 may include a dynamic artifact generator 1473 (e.g., a machine-learned model, an artificial intelligence (AI) coding agent, etc.) that can autonomously generate a CI/CD artifact for the computational agent instance 1460 based on an evaluation of the output 1466. For another example, the local artifact handler 1472 may receive or obtain a CI/CD artifact from a developer associated with the external computing environment 1408-1.

The local artifact handler 1472 can transmit the CI/CD artifact 1442 to the agentic CI/CD module 1418. The artifact handler 1440 can evaluate the CI/CD artifact 1442 to ensure compatibility, performance, security, etc., and then transmit the CI/CD artifact 1442 to the agentic controller instance 1462 for deployment. In such fashion, implementations described herein enables a CI/CD development pipeline in which both developers of the agentic module 1428 and developers associated with the external computing environment to which the agentic module 1428 is deployed can submit CI/CD artifacts for integration and deployment (e.g., developers employed by the client that implements the external computing environment 1408-1, etc.).

Figure 15:
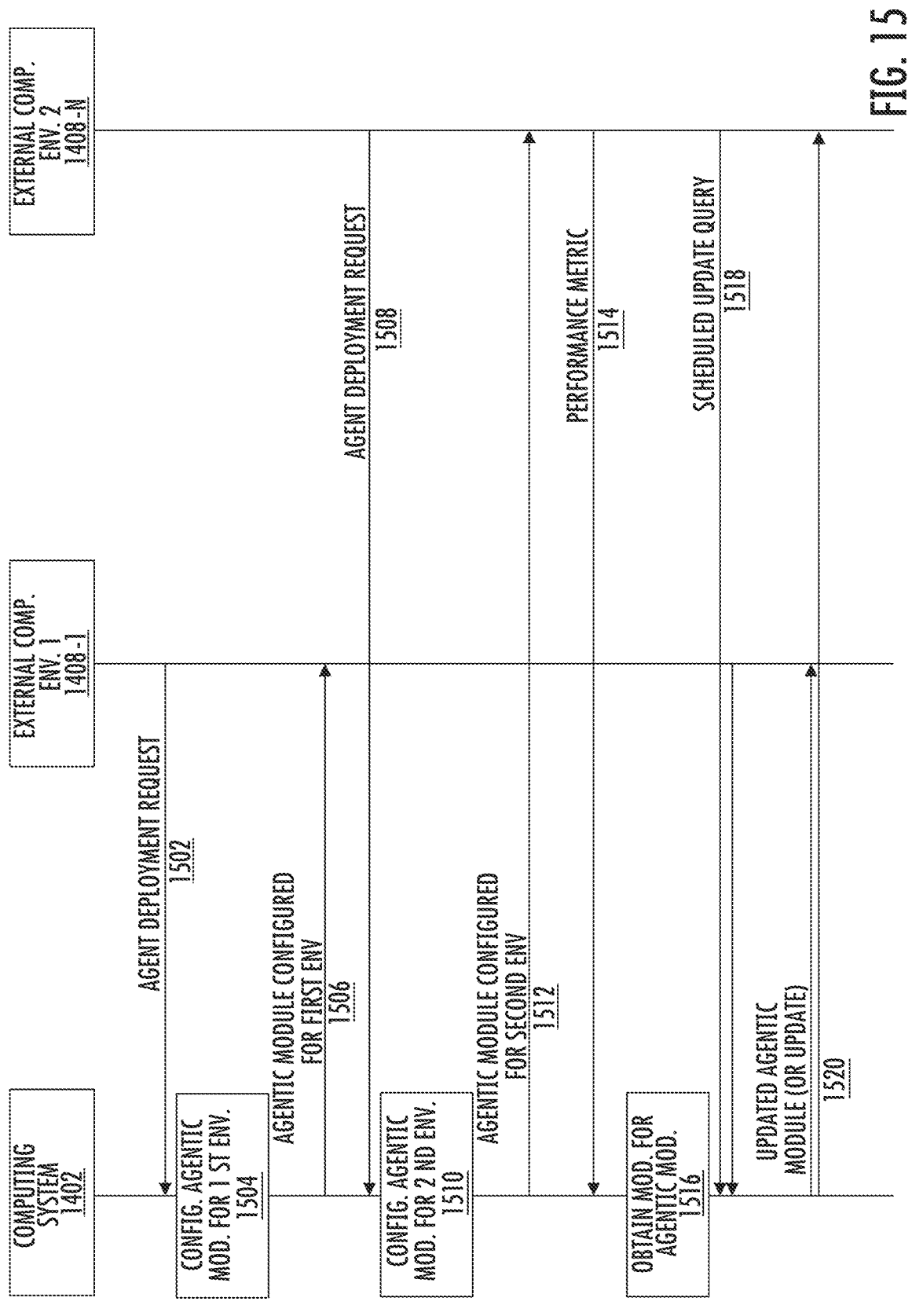
FIG. 15 is a communication flow diagram between the computing system and the external computing environments of FIG. 14 for implementation of CI/CD via remotely deployed agents according to some implementations of the present disclosure.

FIG. 15 is a communication flow diagram between the computing system 1402 and the external computing environments 1408-1 and 1408-N of FIG. 14 for implementation of CI/CD via remotely deployed agents according to some implementations of the present disclosure. FIG. 15 will be discussed in conjunction with FIG. 14. More specifically, at 1502, the external computing environment 1408-1 can send the agent deployment request 1436 to the computing system 1402. For example, a computing device located within the external computing environment 1408-1 may send the agent deployment request 1436 to the agentic CI/CD module 1418, and/or the code versioning system 1471, of the computing system 1402 (e.g., via a specific port, API, address, etc.).

At 1504, the computing system 1402 can configure the agentic module 1428 for deployment to the external computing environment 1408-1 based on the environment characteristic(s) 1434 of the external computing environment 1408-1. The agentic module 1428 can include a computational agent 1422-1 and an agentic controller 1424-1. For example, the agentic module configurator 1426 may select the computational agent 1422-1 and the agentic controller 1424-1 for inclusion in the agentic module 1428 based on the environment characteristic(s) 1434. The computational agent 1422-1 can be operable to process information, such as the sensitive information 1464, stored within the external computing environment 1408-1.

At 1506, the computing system 1402 can send (or otherwise make accessible) the configured agentic module 1428 to the external computing environment 1408-1. In some implementations, the computing system 1402 can generate a unit of software instructions 1446 that, when executed, instantiates an agentic module instance 1458 of the agentic module 1428. For example, the computing system 1402 may send a container image comprising the agentic module 1428. For another example, the computing system 1402 may send a build file or the like that, when executed, can retrieve the agentic module 1428 and corresponding dependencies 1450.

At 1508, the external computing environment 1408-N can send a second agentic deployment request to the computing system 1402. The second agentic deployment request can request deployment of the agentic module 1428 to the external computing environment 1408-N. The second agentic deployment request can include, or otherwise describe, environment characteristics of the external computing environment 1408-N, which can be different from the environment characteristics of the external computing environment 1408-1. As such, the computing system 1402 can configure the agentic module 1428 for the external computing environment 1408-N differently than the agentic module 1428 was configured for the external computing environment 1408-1.

In some implementations, the computing system 1402 may select the computational agent 1422-1 for inclusion in the agentic module 1428 configured for the external computing environment 1408-1 while selecting the computational agent(s) 1422-2 and/or 1422-N for inclusion in the agentic module 1428 configured for the external computing environment 1408-N. For example, assume that the computational agent 1422-1 includes a large foundational model (LFM) (e.g., a large multimodal model, a large language model, etc.) with a parameter count of 70 billion, while the computational agent 1422-2 includes a distilled version of the same LFM with a parameter count of 7 billion. If the external computing environment 1408-1 has ample computing resource availability and the external computing environment 1408-N has substantially lower computing resource availability, the computing system 1402 may select the computational agent 1422-1 for the external computing environment 1408-1 and the computational agent 1422-2 for the external computing environment 1408-N.

At 1510, responsive to the second agent deployment request, the computing system 1402 can configure the agentic module 1428 for deployment to the external computing environment 1408-N. At 1512, the computing system can send the configured agentic module 1428 to the external computing environment 1408-N.

At 1514, the computing system 1402 can receive the performance metric 1468 from the external computing environment 1408-N. More specifically, the computing system 1402 can receive the performance metric 1468 from an instance of the agentic controller 1424-1 within the external computing environment 1408-N. The performance metric 1468 can be related to processing of the information stored to the external computing environment 1408-N (e.g., the sensitive information 1464, etc.).

At 1516, the computing system 1402 can obtain a modification (i.e., CI/CD artifact) 1442 for the agentic module 1428 deployed to the external computing environment 1408-N. The modification 1442 can be based on the performance metric 1468 received at 1510. In some implementations, the modification 1442 can be specific to the computational agent instantiated within the external computing environment 1408-N. If that computational agent is the same as the computational agent instantiated within the external computing environment 1408-1, the modification can be applied to the agentic modules in both environments.

At 1518, instances of the agentic controller 1424-1 instantiated in the external computing environment 1408-1 and 1408-N can query the computing system 1402 whether an update is available for the agentic module 1428. In response, at 1520, the computing system 1402 can send the CI/CD artifact 1442 (or a new packaged agentic model that includes the CI/CD artifact 1442) to the external computing environments 1408-1 and 1408-N.

Figure 16:
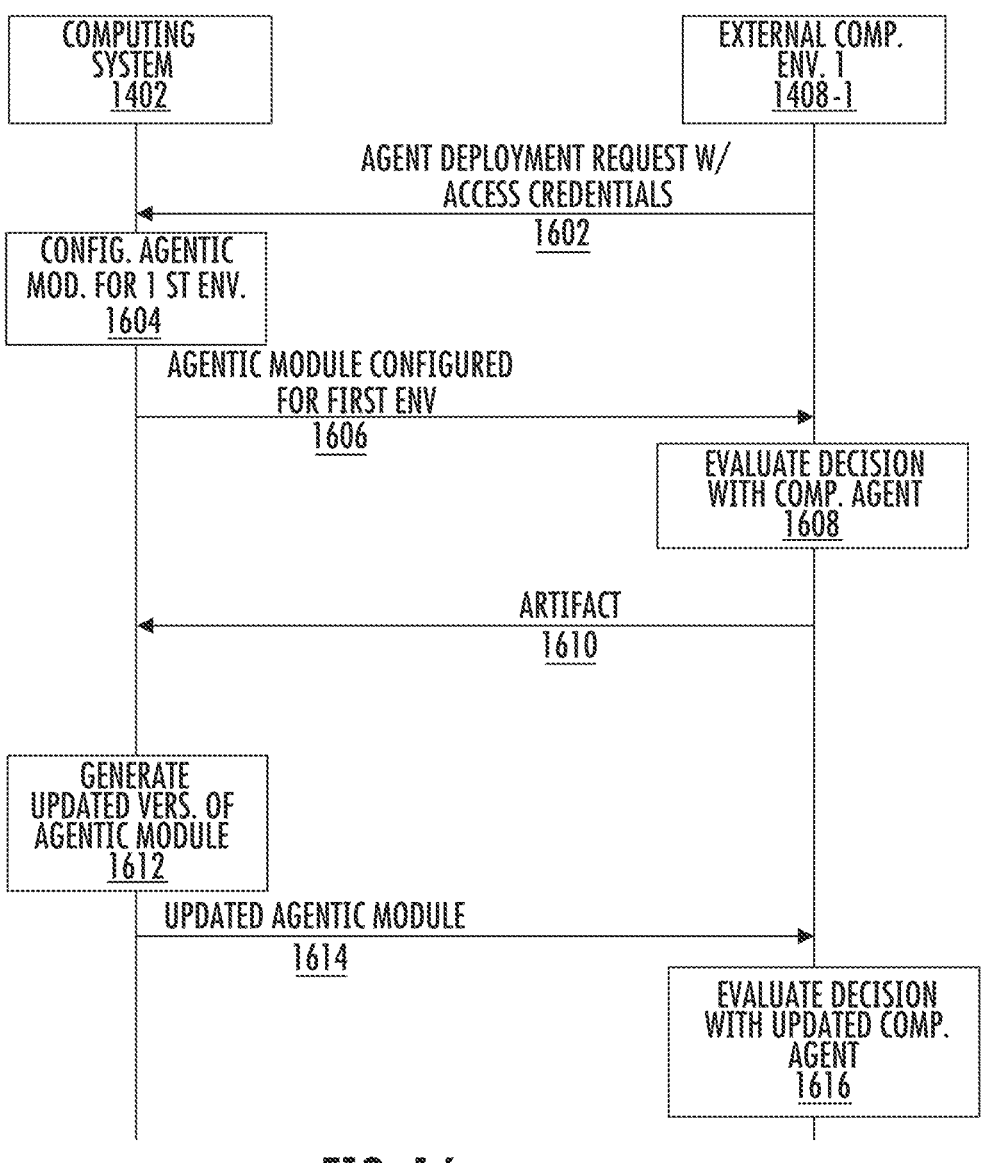
FIG. 16 is a communication flow diagram between the computing system and the external computing environments of FIG. 14 for modifying decision logic via remotely deployed agents according to some implementations of the present disclosure.

FIG. 16 is a communication flow diagram between the computing system 1402 and the external computing environments 1408-1 and 1408-N of FIG. 14 for modifying decision logic via remotely deployed agents according to some implementations of the present disclosure. FIG. 15 will be discussed in conjunction with FIG. 14. More specifically, at 1602, the external computing environment 1408-1 can send the agent deployment request 1436 to the computing system 1402. The agent deployment request 1436 can include access credentials for accessing the external computing environment 1408-1. For example, the access credentials may be access credential for a cloud computing platform used to implement the external computing environment 1408-1. For another example, the access credentials may be for a file transfer protocol or the like.

At 1604, the computing system can configure the agentic module 1428 for the external computing environment 1408-1 as described with regards to FIG. 15. At 1606, the computing system can send the agentic module 1428 to the external computing environment 1408-1 as described with regards to FIG. 15.

At 1608, the external computing environment 1408-1 (or a computing device within the environment) can use the computational agent instance 1460 to evaluate a decision based on one or more criteria. In some implementations, the decision may be a content item selection decision in which the computational agent instance 1460 selects one of a plurality of content items to serve to a user browsing a web site associated with the external computing environment

1408-1. For example, the computational agent instance 1460 may process a set of inputs including information related to the user, the web site, the content items, etc. The computational agent 1460 can evaluate the inputs against the criteria to select the content item for the user. For example, the content item may be selected based on the user's household income being above threshold value, a demographic associated with the user, etc.

At 1610, the external computing environment 1408-1 can send a CI/CD artifact 1442 to the computing system 1402. The CI/CD artifact 1442 can be an adjustment to the criteria and/or decision logic evaluated by the computational agent instance 1460 at 1608.

At 1612, the computing system 1402 can validate the CI/CD artifact 1442 and generate an updated version of the agentic module. For example, the computing system 1402 can validate that the CI/CD artifact 1442 is compatible the external computing environment 1408-1. The computing system 1402 can then generate an updated version of the agentic module 1428 that incorporates the CI/CD artifact 1442.

At 1614, the computing system 1402 can send the updated agentic module to the external computing environment 1408-1. At 1616, the external computing environment 1408-1 can evaluate a decision with an instance of the updated computational agent of the updated agentic module. In such fashion, implementations described herein can enable CI/CD development pipelines that are accessible to both developers of the agentic module 1428 and developers associated with the client environment to which the agentic module 1428 is deployed.

FIG. 17 depicts a flow chart diagram of an example method 1700 for deployment of a remote agentic module to implement CI/CD processes according to some implementations of the present disclosure. Although FIG. 17 depicts steps performed in a particular order for purposes of illustration and discussion, the methods of the present disclosure are not limited to the particularly illustrated order or arrangement. The various steps of the method 1700 can be omitted, rearranged, combined, and/or adapted in various ways without deviating from the scope of the present disclosure.

At 1702, a computing system can receive an agent deployment request for an external computing environment external to the computing system.

At 1704, the computing system can configure an agentic module for deployment to the external computing environment based on one or more characteristics of the external computing environment, wherein the agentic module includes a computational agent and a corresponding agentic controller, wherein the computational agent is operable to process information stored within the external computing environment.

At 1706, the computing system can, responsive to the agent deployment request, generate a first unit of software instructions that, when executed, instantiates an agentic module instance within the external computing environment. In some implementations, the first unit of software instructions includes a packaged agentic module including one or more dependencies. To configure the agentic module for deployment to the external computing environment based on the one or more characteristics of the external computing environment, the computing system can select, by the computing system, the one or more dependencies from a plurality of candidate dependencies based on the one or more characteristics of the external computing environment. In some implementations, the one or more characteristics of the external computing environment includes at least one of an identity of a cloud computing platform that implements the external computing environment a type of hardware architecture associated with the external computing environment, a type of operating system associated with the external computing environment, computing resources available within the external computing environment, security requirements associated with the external computing environment, or operating requirements associated with the external computing environment.

In some implementations, the one or more characteristics includes the security requirements associated with the external computing environment. To select the one or more dependencies from the plurality of candidate dependencies based on the one or more characteristics of the external computing environment, the computing system can determine, for each dependency of the one or more dependencies, that the dependency is compatible with the security requirements associated with the external computing environment. Additionally, or alternatively, in some implementations, the one or more characteristics includes the type of operating system associated with the external computing environment. To select the one or more dependencies from the plurality of candidate dependencies based on the one or more characteristics of the external computing environment, the computing system can determine, for each dependency of the one or more dependencies, that the dependency is compatible with the type of operating system associated with the external computing environment.

In some implementations, the agent deployment request includes one or more characteristics of the external computing environment, and wherein, to generate the first unit of software instructions, the computing system can generate a container image including the agentic module and the one or more dependencies, wherein the container image includes the first unit of software instructions.

In some implementations, the agent deployment request includes access credentials for the external computing environment, and, to transmit the first unit of software instructions to the external computing environment, the computing system can access the external computing environment with the access credentials and deploy the first unit of software instructions within the external computing environment.

In some implementations, the agent deployment request further includes second access credentials for a second external computing environment. The computing system can configure the agentic module for deployment to the second external computing environment based on one or more characteristics of the second external computing environment. The computing system can generate a second unit of software instructions that, when executed, instantiates a second agentic module instance within the second external computing environment. The computing system can transmit the second unit of software instructions to the second external computing environment.

In some implementations, the agentic module instance is configured with a first set of dependencies, and wherein the second agentic module instance is configured with a second set of dependencies different than the first set of dependencies. In some implementations, the first unit of software instructions includes a containerized unit of software instructions, and the second unit of software instructions includes a packaged unit of software instructions.

At 1708, the computing system can transmit the first unit of software instructions to the external computing environment.

At 1710, the computing system can receive, from an agentic controller instance of the agentic module instance, a performance metric related to processing of the information stored within the external computing environment by a computational agent instance of the agentic module instance.

In some implementations, the computing system can receive information descriptive of a modification for the agentic module. The computing system can modify the agentic module based on the modification for the agentic module to obtain an updated agentic module including at least one of an updated agentic controller or an updated computational agent. The computing system can generate a second unit of software instructions that, when executed, instantiates an updated agentic module instance within the external computing environment. The computing system can transmit the second unit of software instructions to the agentic controller instance of the agentic module instance.

In some implementations, to transmit the second unit of software instructions to the external computing environment, the computing system can receive, from the agentic controller instance, a query as to whether an update is available for the agentic module. The computing system can transmit the second unit of software instructions to the agentic controller instance of the agentic module instance responsive to the query.

In some implementations, the updated agentic module includes the updated computational agent, and the computing system can receive, from an updated agentic controller instance of an updated agentic module instance deployed to the external computing environment, an updated performance metric related to processing of the information stored within the external computing environment by an updated computational agent instance of the updated agentic module instance, wherein the updated performance metric is greater than the performance metric.

In some implementations, to process the information stored within the external computing environment, the computational agent is operable to perform one or more computational operations. In some implementations, the one or more computational operations include a decision operation in which the computational agent evaluates the information stored within the external computing environment based on one or more criteria. In some implementations, the modification for the agentic module includes at least one of a modification for at least one of the one or more criteria or a new criteria.

In some implementations, the computational agent includes a machine-learned model, and the modification for the agentic module modifies at least one of a parameter of the machine-learned model or a prompt provided to the machine-learned model.

In some implementations, the computing system implements a CI/CD development pipeline, and wherein the modification for the agentic module includes a CI/CD artifact.

In some implementations, to receive the information descriptive of the modification for the agentic module, the computing system can receive the CI/CD artifact from a code versioning system associated with the agentic module, wherein the CI/CD artifact is submitted by a developer of the agentic module. Additionally, or alternatively, in some implementations, to receive the information descriptive of the modification for the agentic module, the computing system can receive the CI/CD artifact from the external computing environment, wherein the CI/CD artifact is submitted by a developer associated with the external computing environment.

Figure 18:
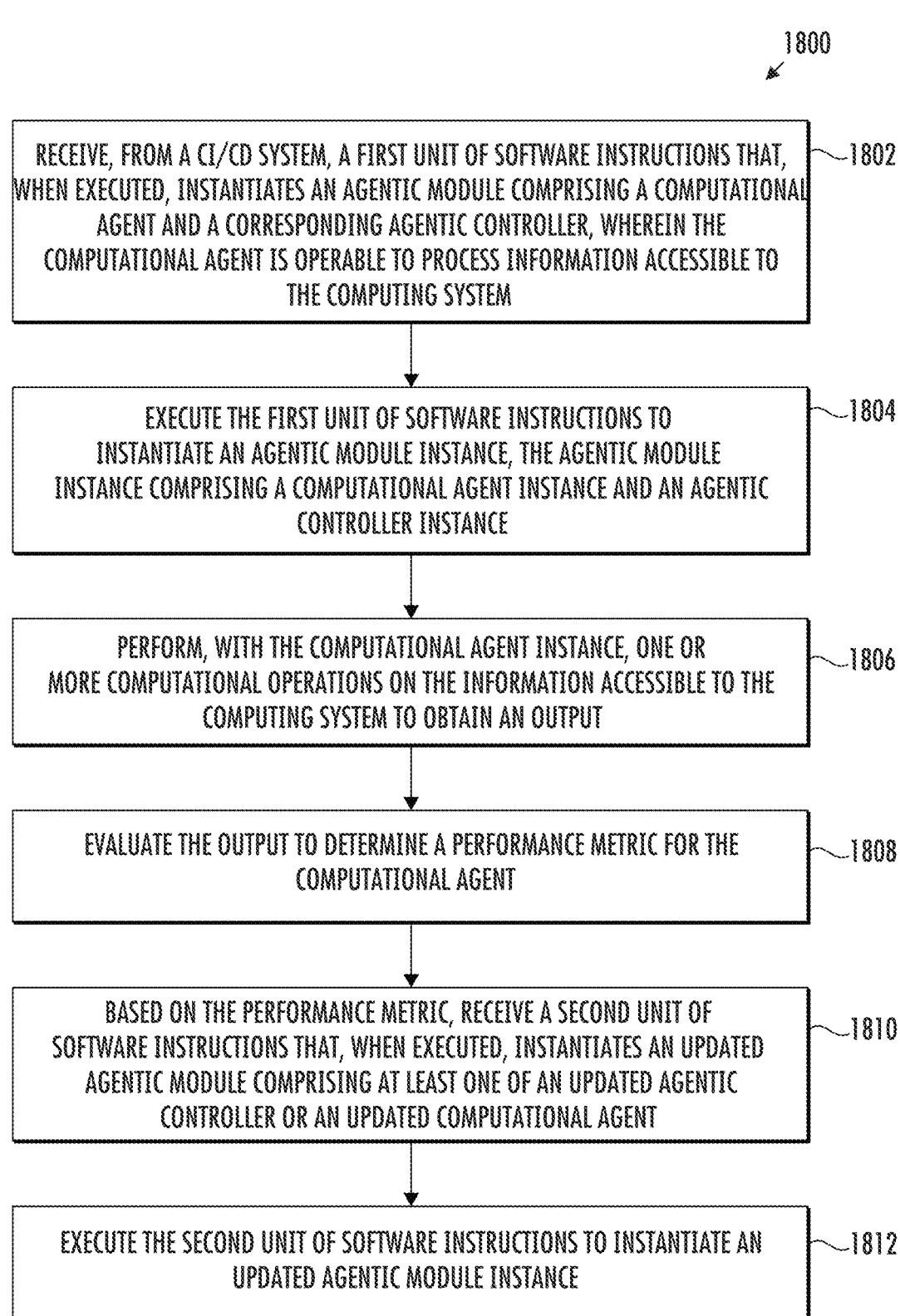
FIG. 18 depicts a flow chart diagram of an example method for updating a remotely deployed agentic module via a CI/CD pipeline according to some implementations of the present disclosure.

FIG. 18 depicts a flow chart diagram of an example method 1800 for updating a remotely deployed agentic module via a CI/CD pipeline according to some implementations of the present disclosure. Although FIG. 18 depicts steps performed in a particular order for purposes of illustration and discussion, the methods of the present disclosure are not limited to the particularly illustrated order or arrangement. The various steps of the method 1800 can be omitted, rearranged, combined, and/or adapted in various ways without deviating from the scope of the present disclosure.

At 1802, a computing system can receive, from a CI/CD system, a first unit of software instructions that, when executed, instantiates an agentic module including a computational agent and a corresponding agentic controller, wherein the computational agent is operable to process information accessible to the computing system.

At 1804, the computing system can execute the first unit of software instructions to instantiate an agentic module instance, the agentic module instance including a computational agent instance and an agentic controller instance.

At 1806, the computing system can perform, with the computational agent instance, one or more computational operations on the information accessible to the computing system to obtain an output.

At 1808, the computing system can evaluate the output to determine a performance metric for the computational agent.

At 1810, the computing system can, based on the performance metric, receive a second unit of software instructions that, when executed, instantiates an updated agentic module including at least one of an updated agentic controller or an updated computational agent. In some implementations, the updated agentic module instance includes an updated computational agent instance, and the computing system can perform, with the updated computational agent instance, one or more computational operations on the information accessible to the computing system to obtain a second output. The computing system can evaluate the second output to determine a second performance metric for the computational agent, wherein the second performance metric is greater than the performance metric.

In some implementations, to receive the second unit of software instructions based on the performance metric, the computing system can transmit, with the agentic controller instance, the performance metric to the CI/CD system. The computing system can receive the second unit of software instructions from the CI/CD system.

In some implementations, to receive the second unit of software instructions based on the performance metric, the computing system can generate a CI/CD artifact based on the performance metric, wherein the CI/CD artifact modifies the agentic module. The computing system can transmit, with the agentic controller instance, the CI/CD artifact to the CI/CD system. The computing system can receive the second unit of software instructions from the CI/CD system.

In some implementations, to receive the second unit of software instructions based on the performance metric, the computing system can, for one or more iterations, transmit, to the CI/CD system with the agentic controller instance, a query as to whether an update is available for the agentic module.

In some implementations, the agentic module includes a modified version of a preceding agentic module, and wherein, prior to receiving the first unit of software instructions from the CI/CD system, the computing system can, for one or more iterations, transmit, to the CI/CD system with an instance of a preceding agentic controller of the preceding agenting module, a query as to whether an update is available for the preceding agentic module.

In some implementations, prior to transmitting the query as to whether the update is available for the preceding agentic module, the computing system can transmit an agent deployment request for the computing system to the CI/CD system, wherein the agent deployment request includes a request to deploy the preceding agentic module at the computing system.

In some implementations, the agent deployment request includes access credentials for the computing system, and wherein, to execute the first unit of software instructions, the computing system is to receive, from the CI/CD system, instructions to execute the preceding agentic module, wherein the instructions include the access credentials for the computing system. In some implementations, the one or more computational operations include a decision operation in which the computational agent evaluates the information accessible to the computing system based on one or more criteria.

At 1812, the computing system can execute the second unit of software instructions to instantiate an updated agentic module instance.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-program product tangibly embodied in a non-transitory machine-readable storage medium, the computer-program product including instructions operable to cause a processor device of a computing system to:

receive an agent deployment request for an external computing environment external to the computing system, the external computing environment associated with a first entity, wherein the computing system is associated with a second entity that is different from the first entity;

configure an agentic module for deployment to the external computing environment based on one or more characteristics of the external computing environment, wherein the agentic module comprises a computational agent and a corresponding agentic controller, wherein the computational agent is operable to process information associated with the first entity and stored within the external computing environment, the information associated with the first entity and stored within the external computing environment comprising sensitive information;

responsive to the agent deployment request, generate a first unit of software instructions that, when executed, instantiates an agentic module instance within the external computing environment;

transmit the first unit of software instructions to the external computing environment;

receive, from an agentic controller instance of the agentic module instance, a performance metric related to processing of the information associated with the first entity and stored within the external computing environment by a computational agent instance of the agentic module instance, wherein the performance metric is configured to prevent access by the computing system to the sensitive information; and based on the performance metric, update the agentic module instance within the external computing environment.

2. The computer-program product of claim 1, wherein, to update the agentic module instance within the external computing environment, the processor device is further to:

receive information descriptive of a modification for the agentic module;

modify the agentic module based on the modification for the agentic module to obtain an updated agentic module comprising at least one of an updated agentic controller or an updated computational agent;

generate a second unit of software instructions that, when executed, instantiates an updated agentic module instance within the external computing environment; and transmit the second unit of software instructions to the agentic controller instance of the agentic module instance.

3. The computer-program product of claim 2, wherein, to transmit the second unit of software instructions to the external computing environment, the processor device is to:

receive, from the agentic controller instance, a query as to whether an update is available for the agentic module; and transmit the second unit of software instructions to the agentic controller instance of the agentic module instance responsive to the query.

4. The computer-program product of claim 2, wherein the updated agentic module comprises the updated computational agent, and wherein the processor device is further to:

receive, from an updated agentic controller instance of the updated agentic module instance deployed to the external computing environment, an updated performance metric related to processing of the information associated with the first entity and stored within the external computing environment by an updated computational agent instance of the updated agentic module instance, wherein the updated performance metric is greater than the performance metric.

5. The computer-program product of claim 2, wherein to process the information associated with the first entity and stored within the external computing environment, the computational agent is operable to perform one or more computational operations.

6. The computer-program product of claim 5, wherein the one or more computational operations comprise a decision operation in which the computational agent evaluates the information associated with the first entity and stored within the external computing environment based on one or more criteria.

7. The computer-program product of claim 6, wherein the modification for the agentic module comprises at least one of:

a modification for at least one of the one or more criteria; or a new criteria.

8. The computer-program product of claim 5, wherein the computational agent comprises a machine-learned model; and wherein the modification for the agentic module modifies at least one of:

a parameter of the machine-learned model; or a prompt provided to the machine-learned model.

9. The computer-program product of claim 5, wherein the computing system implements a continuous integration/continuous delivery (CI/CD) development pipeline, and wherein the modification for the agentic module comprises a CI/CD artifact.

10. The computer-program product of claim 9, wherein, to receive the information descriptive of the modification for the agentic module, the processor device is to:

receive the CI/CD artifact from a code versioning system associated with the agentic module, wherein the CI/CD artifact is submitted by a developer of the agentic module.

11. The computer-program product of claim 9, wherein, to receive the information descriptive of the modification for the agentic module, the processor device is to:

receive the CI/CD artifact from the external computing environment, wherein the CI/CD artifact is submitted by a developer associated with the external computing environment.

12. The computer-program product of claim 1, wherein the first unit of software instructions comprises a packaged agentic module comprising one or more dependencies, and wherein, to configure the agentic module for deployment to the external computing environment based on the one or more characteristics of the external computing environment, the processor device is to:

select, by the computing system, the one or more dependencies from a plurality of candidate dependencies based on the one or more characteristics of the external computing environment.

13. The computer-program product of claim 12, wherein the one or more characteristics of the external computing environment comprises at least one of:

an identity of a cloud computing platform that implements the external computing environment;

a type of hardware architecture associated with the external computing environment;

a type of operating system associated with the external computing environment;

computing resources available within the external computing environment;

security requirements associated with the external computing environment; or operating requirements associated with the external computing environment.

14. The computer-program product of claim 13, wherein the one or more characteristics comprises the security requirements associated with the external computing environment, and wherein, to select the one or more dependencies from the plurality of candidate dependencies based on the one or more characteristics of the external computing environment, the processor device is to:

determine, for each dependency of the one or more dependencies, that the dependency is compatible with the security requirements associated with the external computing environment.

15. The computer-program product of claim 13, wherein the one or more characteristics comprise the type of operating system associated with the external computing environment, and wherein, to select the one or more dependencies from the plurality of candidate dependencies based on the one or more characteristics of the external computing environment, the processor device is to:

determine, for each dependency of the one or more dependencies, that the dependency is compatible with the type of operating system associated with the external computing environment.

16. The computer-program product of claim 13, wherein the agent deployment request comprises the one or more characteristics of the external computing environment, and wherein, to generate the first unit of software instructions, the processor device is to:

generate a container image comprising the agentic module and the one or more dependencies, wherein the container image comprises the first unit of software instructions.

17. The computer-program product of claim 1, wherein the agent deployment request comprises access credentials for the external computing environment; and wherein, to transmit the first unit of software instructions to the external computing environment, the processor device is to:

access the external computing environment with the access credentials; and deploy the first unit of software instructions within the external computing environment.

18. The computer-program product of claim 17, wherein the agent deployment request further comprises second access credentials for a second external computing environment; and wherein the processor device is to:

configure the agentic module for deployment to the second external computing environment based on one or more characteristics of the second external computing environment;

generate a second unit of software instructions that, when executed, instantiates a second agentic module instance within the second external computing environment; and transmit the second unit of software instructions to the second external computing environment.

19. The computer-program product of claim 18, wherein the agentic module instance is configured with a first set of dependencies, and wherein the second agentic module instance is configured with a second set of dependencies different than the first set of dependencies.

20. The computer-program product of claim 18, wherein the first unit of software instructions comprises a containerized unit of software instructions, and wherein the second unit of software instructions comprises a packaged unit of software instructions.

21. A computing system, comprising:

a processor device; and a non-transitory computer-readable storage medium containing instructions which, when executed on the processor device, causes the processor device to:

receive, from a continuous integration/continuous delivery (CI/CD) system, a first unit of software instructions that, when executed, instantiates an agentic module comprising a computational agent and a corresponding agentic controller, wherein the computational agent is operable to process information accessible to the computing system, the information accessible to the computing system comprising sensitive information;

execute the first unit of software instructions to instantiate an agentic module instance, the agentic module instance comprising a computational agent instance and an agentic controller instance;

perform, with the computational agent instance, one or more computational operations on the information accessible to the computing system to obtain an output;

evaluate the output to determine a performance metric for the computational agent;

transmit, to the CI/CD system, the performance metric, wherein the performance metric is configured to prevent access by the CI/CD system to the sensitive information;

based on the performance metric, receive a second unit of software instructions that, when executed, instantiates an updated agentic module comprising at least one of an updated agentic controller or an updated computational agent; and execute the second unit of software instructions to instantiate an updated agentic module instance.

22. The computing system of claim 21, wherein the updated agentic module instance comprises an updated computational agent instance, and wherein the processor device is further to:

perform, with the updated computational agent instance, one or more computational operations on the information accessible to the computing system to obtain a second output; and evaluate the second output to determine a second performance metric for the computational agent, wherein the second performance metric is greater than the performance metric.

23. The computing system of claim 21, wherein, to receive the second unit of software instructions based on the performance metric, the processor device is to:

receive the second unit of software instructions from the CI/CD system.

24. The computing system of claim 23, wherein, to receive the second unit of software instructions based on the performance metric, the processor device is to:

generate a CI/CD artifact based on the performance metric, wherein the CI/CD artifact modifies the agentic module;

transmit, with the agentic controller instance, the CI/CD artifact to the CI/CD system; and receive the second unit of software instructions from the CI/CD system.

25. The computing system of claim 24, wherein, to receive the second unit of software instructions based on the performance metric, the processor device is further to:

for one or more iterations, transmit, to the CI/CD system with the agentic controller instance, a query as to whether an update is available for the agentic module.

26. The computing system of claim 25, wherein the agentic module comprises a modified version of a preceding agentic module, and wherein, prior to receiving the first unit of software instructions from the CI/CD system, the processor device is to:

for one or more iterations, transmit, to the CI/CD system with an instance of a preceding agentic controller of the preceding agentic module, a query as to whether an update is available for the preceding agentic module.

27. The computing system of claim 26, wherein, prior to transmitting the query as to whether the update is available for the preceding agentic module, the processor device is to:

transmit an agent deployment request for the computing system to the CI/CD system, wherein the agent deployment request comprises a request to deploy the preceding agentic module at the computing system.

28. The computing system of claim 27, wherein the agent deployment request comprises access credentials for the computing system, and wherein, to execute the first unit of software instructions, the processor device is to:

receive, from the CI/CD system, instructions to execute the preceding agentic module, wherein the received instructions include the access credentials for the computing system.

29. The computing system of claim 21, wherein the one or more computational operations comprise a decision operation in which the computational agent evaluates the information accessible to the computing system based on one or more criteria.

30. A method, comprising:

receiving, by a computing system comprising one or more processor devices, an agent deployment request for an external computing environment external to the computing system, the external computing environment associated with a first entity, wherein the computing system is associated with a second entity that is different from the first entity;

configuring, by the computing system, an agentic module for deployment to the external computing environment based on one or more characteristics of the external computing environment, wherein the agentic module comprises a computational agent and a corresponding agentic controller, wherein the computational agent is operable to process information associated with the first entity and stored within the external computing environment, the information associated with the first entity and stored within the external computing environment comprising sensitive information;

responsive to the agent deployment request, generating, by the computing system, a first unit of software instructions that, when executed, instantiates an agentic module instance within the external computing environment;

transmitting, by the computing system, the first unit of software instructions to the external computing environment;

receiving, by the computing system and from an agentic controller instance of the agentic module instance, a performance metric related to processing of the information associated with the first entity and stored within the external computing environment by a computational agent instance of the agentic module instance, wherein the performance metric is configured to prevent access by the computing system to the sensitive information; and based on the performance metric, updating, by the computing system, the agentic module instance within the external computing environment.

* * * * *